United States Patent
Okano et al.

(10) Patent No.: US 9,701,288 B2
(45) Date of Patent: Jul. 11, 2017

(54) HYDRAULIC BRAKE SYSTEM

(71) Applicants: Takahiro Okano, Anjo (JP); Yusuke Kamiya, Okazaki (JP); Kiyohito Takeuchi, Nagoya (JP)

(72) Inventors: Takahiro Okano, Anjo (JP); Yusuke Kamiya, Okazaki (JP); Kiyohito Takeuchi, Nagoya (JP)

(73) Assignees: TOYOTA JIDOSHA KABUSHIKI KAISHA, Toyota (JP); ADVICS CO., LTD., Kariya-shi (JP)

( * ) Notice: Subject to any disclaimer, the term of this patent is extended or adjusted under 35 U.S.C. 154(b) by 273 days.

(21) Appl. No.: 14/407,004

(22) PCT Filed: Jun. 20, 2013

(86) PCT No.: PCT/JP2013/066952
§ 371 (c)(1),
(2) Date: Dec. 10, 2014

(87) PCT Pub. No.: WO2013/191246
PCT Pub. Date: Dec. 27, 2013

(65) Prior Publication Data
US 2015/0107241 A1    Apr. 23, 2015

(30) Foreign Application Priority Data

Jun. 22, 2012 (JP) ................. 2012-140603

(51) Int. Cl.
*B60T 8/171* (2006.01)
*B60T 8/36* (2006.01)
(Continued)

(52) U.S. Cl.
CPC .............. *B60T 8/171* (2013.01); *B60T 7/042* (2013.01); *B60T 8/367* (2013.01); *B60T 8/4077* (2013.01);
(Continued)

(58) Field of Classification Search
CPC ........ B60T 8/171; B60T 8/367; B60T 8/4077; B60T 13/686; B60T 13/662; B60T 7/042; B60T 8/363; F15B 13/044
See application file for complete search history.

(56) References Cited

U.S. PATENT DOCUMENTS 6,322,166 B1 * 11/2001 Furuya ................ B60T 8/36
251/129.05
6,412,882 B1 * 7/2002 Isono ................ B60K 6/22
303/11

(Continued)

FOREIGN PATENT DOCUMENTS

JP    A-2009-61816    3/2009
JP    A-2010-69991    4/2010

(Continued)

*Primary Examiner* — Xuan Lan Nguyen
*Assistant Examiner* — Lan Nguyen
(74) *Attorney, Agent, or Firm* — Oliff PLC

(57) ABSTRACT

A hydraulic brake system is configured such that a pressure of a working fluid from a high-pressure-source device is adjusted by electromagnetic pressure-increase and pressure-decrease linear valves and such that a brake device generates a braking force having a magnitude that depends on the pressure adjusted by the linear valves, wherein the following controls are selectively executable, as a control of the energizing currents supplied to the linear valves, a feedback control based on a difference between an actual braking-force index and a target braking-force index; and a feedforward control based on the target braking-force index executed by placing each valve in a valve equilibrium state, wherein, in the feedforward control, an energizing current is supplied to at least one of the two linear valves, the energizing current being larger than that according to a preset relationship between a braking-force index and an energizing current in the valve equilibrium state.

14 Claims, 15 Drawing Sheets

(51) Int. Cl.
*B60T 8/40* (2006.01)
*F15B 13/044* (2006.01)
*B60T 7/04* (2006.01)
*B60T 13/66* (2006.01)
*B60T 13/68* (2006.01)

(52) U.S. Cl.
CPC .......... *B60T 13/662* (2013.01); *B60T 13/686* (2013.01); *F15B 13/044* (2013.01)

(56) References Cited

U.S. PATENT DOCUMENTS

| | | | |
|---|---|---|---|
| 7,708,354 B2 * | 5/2010 | Ohkubo | B60T 8/17616 |
| | | | 303/119.2 |
| 8,870,301 B2 * | 10/2014 | Ohkubo | B60T 8/3655 |
| | | | 303/116.1 |
| 2005/0225164 A1 * | 10/2005 | Obai | B60T 8/17616 |
| | | | 303/3 |
| 2009/0302675 A1 | 12/2009 | Nakaoka et al. | |
| 2013/0127241 A1 * | 5/2013 | Sakata | B60T 13/58 |
| | | | 303/14 |

FOREIGN PATENT DOCUMENTS

| JP | A-2010-270798 | 12/2010 |
|---|---|---|
| JP | A-2011-156998 | 8/2011 |

\* cited by examiner

HYDRAULIC BRAKE SYSTEM

TECHNICAL FIELD

The present invention relates to a hydraulic brake system for braking a vehicle.

BACKGROUND ART

A hydraulic brake system described in the following Patent Literature is known in which a pressure of a working fluid supplied from a high-pressure source is adjusted by an electromagnetic pressure-increase linear valve and an electromagnetic pressure-decrease linear valve, and the working fluid whose pressure is adjusted is supplied to a brake device provided for a wheel, whereby the brake device generates a braking force in accordance with the pressure of the working fluid. In such a system, namely, in a system in which the braking force whose magnitude depends on the pressure adjusted by the pressure-increase linear valve and the pressure-decrease linear valve (hereinafter referred to as "pressure adjusting system utilizing linear valves" where appropriate), the braking force is controlled by controlling an energizing current supplied to each of the pressure-increase linear valve and the pressure-decrease linear valve.

CITATION LIST

Patent Literature

Patent Literature 1: JP-A-2011-156998

SUMMARY OF INVENTION

Technical Problem

In the pressure adjusting system utilizing linear valves described above, a better control of the braking force is ensured by making some improvements to a technique of controlling the energizing current supplied to each of the pressure-increase linear valve and the pressure-decrease linear valve. As a result, the utility of the pressure adjusting system utilizing linear valves can be enhanced. In view of such situations, it is an object of the invention to provide a hydraulic brake system having high utility.

Solution to Problem

To achieve the object indicated above, a hydraulic brake system of the invention is configured such that a pressure of a working fluid supplied from a high-pressure-source device is adjusted by an electromagnetic pressure-increase linear valve and an electromagnetic pressure-decrease linear valve and such that a brake device provided for a wheel generates a braking force having a magnitude that depends on the pressure adjusted by the linear valves. In the hydraulic brake system of the invention, the following controls are selectively executable as a control of the energizing currents supplied to the pressure-increase linear valve and the pressure-decrease linear valve: a feedback control based on a difference between an actual braking-force index and a target braking-force index; and a feedforward control based on the target braking-force index executed by placing each of the pressure-increase linear valve and the pressure-decrease linear valve in a valve equilibrium state. Further, in the feedforward control, an energizing current is supplied to at least one of the pressure-increase linear valve and the pressure-decrease linear valve, the energizing current being larger than an energizing current according to a preset relationship between a braking-force index and an energizing current in the valve equilibrium state.

Advantageous Effects of Invention

According to the hydraulic brake system of the invention, the feedforward control that does not depend on the actual braking-force index is executable, in addition to the feedback control. Further, a sufficient braking force is obtained also in the feedforward control. Accordingly, the hydraulic brake system of the invention has high utility.

Forms of Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention. Some of the claimable inventions correspond to inventions described in claims.

In the following forms, the forms (1)-(14) correspond to claims 1-14, respectively.

<Basic Forms>

(1) A hydraulic brake system for braking a vehicle, comprising:

a high-pressure-source device configured to supply a working fluid that is highly pressurized;

an electromagnetic pressure-increase linear valve and an electromagnetic pressure-decrease linear valve configured to adjust a pressure of the working fluid supplied from the high-pressure-source device to an adjusted pressure;

a brake device provided in a wheel and configured to receive the working fluid having the adjusted pressure or a pressure in accordance with the adjusted pressure and to generate a braking force having a magnitude in accordance with the pressure of the received working fluid;

a braking-force index detector configured to detect a braking-force index indicative of the braking force; and a controller configured to control the braking force generated by the brake device by controlling an energizing current supplied to each of the pressure-increase linear valve and the pressure-decrease linear valve, wherein the controller is configured to selectively execute one of: (a) a feedback control in which a feedback component that is a component of the energizing current supplied to each of the pressure-increase linear valve and the pressure-decrease linear valve is determined based on a difference between an actual braking-force index detected by the braking-force index detector and a target braking-force index that is a target of the braking-force index in a control, so as to lessen the difference and in which the energizing current that contains the feedback component is supplied to each of the pressure-increase linear valve and the pressure-decrease linear valve; and (b) a feedforward control in which a feedforward component that is a component of the energizing current supplied to each of the pressure-increase linear valve and the pressure-decrease linear valve is determined based on the target braking-force index, so as to place each of the pressure-increase linear valve and the pressure-decrease linear valve in a valve equilibrium state that is a boundary between a valve open state and a valve closed state and in which the energizing current that consists of the feedforward component is supplied to each of the pressure-increase linear valve and the pressure-decrease linear valve, and wherein the controller is configured to determine, when the feedforward control is executed, the energizing current supplied to at least one of the pressure-increase linear valve and the pressure-decrease linear valve so as to be equal to a value that is shifted toward a side on which the braking force is large, as compared with the energizing current in an instance in which the feedforward component is determined according to a preset relationship between the braking-force index and the energizing current in the valve equilibrium state.

In the system according to this form, the brake device generates a braking force having a magnitude that depends on the pressure of the working fluid adjusted by the electromagnetic pressure-increase linear valve and the electromagnetic pressure-decrease linear valve. In the system of this form, the pressure-increase linear valve and the pressure-decrease linear valve may be disposed in series between the high-pressure-source device as a high-pressure source and a low-pressure source, and a pressure of the working fluid existing between the two linear valves may be adjusted by the two linear valves. The system of this form may be configured such that the working fluid having a pressure adjusted by the pressure-increase linear valve and the pressure-decrease linear valve (hereinafter referred to as "adjusted pressure" where appropriate) is supplied directly to the brake device. Further, the system of this form may be configured such that the working fluid having the adjusted pressure is supplied to a pressure regulator or a master cylinder device, and the working fluid having a pressure in accordance with the adjusted pressure is supplied from the pressure regulator or the master cylinder device to the brake device, as later explained. Moreover, the system of this form may be configured such that the working fluid having the adjusted pressure is supplied to the pressure regulator, the working fluid having a pressure in accordance with the adjusted pressure is supplied from the pressure regulator to the master cylinder device, and, the working fluid that is pressurized to a pressure in accordance with the pressure is supplied from the master cylinder device to the brake device.

The "braking-force index" in this form directly or indirectly indicates the braking force generated by the brake device, more specifically, the magnitude of the braking force. In this form, the braking force per se generated by the brake device may be employed as the braking-force index or the pressure of the working fluid supplied to the brake device may be employed as the braking-force index. To be more specific, where the system is configured such that the working fluid having the adjusted pressure is introduced directly into the brake device, the adjusted pressure per se may be employed as the braking-force index. Where the system has the master cylinder device and is configured such that the working fluid supplied from the master cylinder device is supplied to the brake device, a pressure of the working fluid supplied from the master cylinder device (hereinafter referred to as "master pressure" where appropriate) may be employed as the braking-force index. Where the system has a pressure regulator configured to regulate the pressure of the working fluid supplied form the high-pressure-source device and to supply the working fluid whose pressure is regulated and the brake device generates the braking force having a magnitude in accordance with the pressure of the working fluid supplied from pressure regulator, the pressure of the working fluid supplied from the pressure regulator (hereinafter referred to as "supply pressure of the pressure regulator" where appropriate) may be employed as the braking-force index. Where the pressure regulator is configured to regulate the pressure of the working fluid supplied therefrom in accordance with a pilot pressure introduced thereinto, the pilot pressure may be employed as the braking-force index. In this respect, where the adjusted pressure is introduced as the pilot pressure, the adjusted pressure serves as the braking-force index. Where the pressure of the working fluid such as the adjusted pressure, the master pressure, the supply pressure of the pressure regulator, or the pilot pressure, is employed as the braking-force index, a hydraulic pressure sensor for detecting any of those pressures may be employed as the "braking-force index detector".

The "target braking-force index" is a target for controlling the braking force and is a braking-force index having a value corresponding to a target braking force that is a braking force to be generated by the brake device. More specifically, where the pressure of the working fluid such as the adjusted pressure, the master pressure, the supply pressure of the pressure regulator, or the pilot pressure is employed as the braking-force index, the target braking-force index is a target adjusted pressure, a target master pressure, a target supply pressure of the pressure regulator, or a target pilot pressure. The target braking-force index may be determined based on a degree of a brake operation. More specifically, where the system of this form is equipped with a brake operation member such as a brake pedal on which a driver performs the brake operation, the target braking-force index may be determined based on a brake operation amount that is an operation amount of the brake operation member, a brake operation force that is an operation force applied to the brake operation member by the driver, and so on. Where the hydraulic brake system of this form is mounted on vehicles such as hybrid vehicles having a regenerative brake system, the target braking-force index may be determined while taking account of a regenerative braking force that is a braking force generated by the regenerative brake system.

In the system of this form, both of the feedback control and the feedforward control are selectively executable in relation to the control of the energizing current supplied to each of the pressure-increase linear valve and the pressure-decrease linear valve. In short, the feedback control is a control based on both of the target braking-force index and the actual braking-force index while the feedforward control is a control not based on the actual braking-force index but based on the target braking-force index. Because the two controls are executable in the system of this form, an appropriate one of the two controls is selected and executed depending upon a status of the vehicle, a running situation of the vehicle, and so on. As later explained, it is possible to select and execute the feedforward control in a case where the control based on the actual braking-force index cannot be executed due to a failure of the braking-force index detector, for instance. The braking-force index employed in the feedback control and the braking-force index employed in the feedforward control may differ from each other. To be more specific, in the system equipped with the pressure regulator, it is possible to execute a control based on the supply pressure of the pressure regulator in the feedback control and to execute a control based on the pilot pressure (the adjusted pressure) in the feedforward control.

As later explained in detail, in ordinary pressure-increase linear valves and pressure-decrease linear valves, a valve opening degree that is a degree of ease with which the valves are opened (a valve closing degree that is a degree of ease with which the valves are closed) and a valve opening pressure (a valve closing pressure) are determined by an elastic biasing force of an elastic biasing mechanism such as a spring, a pressure-difference-based acting force, and an electromagnetic acting force. In a state in which these forces are balanced with one another, a boundary state between a valve open state and a valve closed state, namely, the above-indicated valve equilibrium state is established. A component of the energizing current for establishing this state is the above-indicated feedforward component. In the following explanation, each of a pressure on the downstream side of the pressure-increase linear valve in the valve equilibrium state and a pressure on the upstream side of the pressure-decrease linear valve in the valve equilibrium state, namely, the adjusted pressure in the valve equilibrium state, will be referred to as "valve equilibrium pressure" that means a pressure at which the valve open state and the valve closed state are in balance.

More specifically, the elastic biasing force is an intrinsic force of each of the pressure-increase linear valve and the pressure-decrease linear valve. For the pressure-increase linear valve, the pressure-difference-based acting force is determined in dependence on a pressure of the working fluid supplied from the high-pressure-source device (hereinafter referred to as "high-pressure-source pressure" where appropriate) and the adjusted pressure. Because the braking-force index and the adjusted pressure correlate to each other, the pressure-difference-based acting force is determined based on the high-pressure-source pressure and the braking-force index. For the pressure-decrease linear valve, the pressure-difference-based acting force is determined in dependence on a pressure of the low-pressure source (hereinafter referred to as "low-pressure-source pressure" where appropriate) and the adjusted pressure. Accordingly, the pressure-difference-based acting force is determined based on the low-pressure-source pressure and the braking-force index. As explained above, the valve equilibrium state is established in the state in which the elastic biasing force, the pressure-difference-based acting force, and the electromagnetic acting force are balanced with one another, and the electromagnetic acting force depends on the energizing current. Accordingly, the braking-force index and the energizing current correlate with each other in the valve equilibrium state. On the basis of the relationship between the braking-force index and the energizing current in the valve equilibrium state (hereinafter referred to as "correlation" where appropriate), it is possible to determine the feedforward component to be supplied to each of the pressure-increase linear valve and the pressure-decrease linear valve. In this respect, the correlation in the valve equilibrium state may be preset based on the elastic biasing force or the like of each of the pressure-increase linear valve and the pressure-decrease linear valve.

In an ordinary feedforward control, the pressure-difference-based acting force can be determined based on the target braking-force index, for instance. More specifically, there is determined the pressure-difference-based acting force in a state in which the adjusted pressure corresponding to the target braking-force index is equal to the valve equilibrium pressure, and the energizing current can be determined based on the determined pressure-difference-based acting force. In other words, the feedforward component can be determined based on the target braking-force index according to the correlation in the valve equilibrium state. Because the feedback control depends on the feedback component, the braking force adequately follows the target braking force, whereby the braking force can be controlled with relatively high accuracy. In contrast, the feedforward control does not depend on the feedback component and is accordingly inferior to the feedback control in terms of the accuracy of the braking force. In particular, due to changes in characteristics of the pressure-increase linear valve and the pressure-decrease linear valve over time or years, the above-indicated correlation in the valve equilibrium state also changes. Accordingly, where the feedforward component is determined according to a correlation preset at the time of manufacture or shipping of vehicles, it is expected that the accuracy of the braking force may be considerably lowered. That is, there may be a possibility that the braking force generated by the brake device considerably deviates from the braking force that should be generated, causing a risk of shortage of the braking force.

In the feedforward control of the system according to this form, while taking account of the shortage of the braking force described above, the energizing current supplied to at least one of the pressure-increase linear valve and the pressure-decrease linear valve is determined so as not to be equal to an energizing current in an instance in which the feedforward component is determined according to the preset correlation in the valve equilibrium state, but to be equal to an energizing current by which is generated a larger braking force than a braking force generated by the energizing current determined according to the preset correlation. In the system of this form, therefore, a sufficient braking force can be obtained even under the feedforward control. Whether the valve equilibrium pressure becomes high or low by an increase in the energizing current depends on the structure of each of the pressure-increase linear valve and the pressure-decrease linear valve. The valve equilibrium pressure is high in some linear valves and is low in other linear valves. Accordingly, the shifting of the energizing current toward the side on which the braking force is large depends on the structure of each of the pressure-increase linear valve and the pressure-decrease linear valve, and the energizing current is increased in some cases while the energizing current is decreased in other cases.

In the system according to this form, it is not necessarily required that the feedback control and the feedforward control be executed for each of the pressure-increase linear valve and the pressure-decrease linear valve in all of a state in which the braking force is increased (hereinafter referred to as "braking-force increasing state" where appropriate), a state in which the braking force is kept constant (hereinafter referred to as "braking-force constant state" where appropriate), and a state in which the braking force is decreased (hereinafter referred to as "braking-force decreasing state" where appropriate). That is, in one of those states in the brake operation, the same feedback control and feedforward control as in another one of those states need not be executed for at least one of the pressure-increase linear valve and the pressure-decrease linear valve, or the feedback control and the feedforward control per se need not be executed. For instance, in the braking-force decreasing state, it is possible to supply an energizing current to the pressure-increase linear valve for placing the pressure-increase linear valve always in the valve closed state or it is possible not to supply any energizing current to the pressure-increase linear valve for placing the pressure-increase linear valve always in the valve closed state. In the braking-force increasing state, it is possible to supply an energizing current to the pressure-decrease linear valve for placing the pressure-decrease linear valve always in the valve closed state or it is possible not to supply any energizing current to the pressure-decrease linear valve for placing the pressure-decrease linear valve always in the valve closed state. Further, in the braking-force constant state, it is possible to supply, to at least one of the pressure-increase linear valve and the pressure-decrease linear valve, an energizing current that is larger or smaller, by a certain margin, than an energizing current in the braking-force increasing state or the braking-force decreasing state.

<Control Variations>

The following forms relate to variations of the feedforward control and the feedback control.

(2) The hydraulic brake system according to the form (1), wherein the controller is configured to determine, as the feedforward component, the energizing current according to the preset relationship between the braking-force index and the energizing current in the valve equilibrium state based on the actual braking-force index detected by the braking-force index detector and is configured to supply an energizing current that contains the determined feedforward component and the feedback component to each of the pressure-increase linear valve and the pressure-decrease linear valve, in the feedback control.

In the system according to this form, the energizing current in which the feedback component is added to the feedforward component is supplied, in the feedback control, to each of the pressure-increase linear valve and the pressure-decrease linear valve. That is, the energizing current is determined according to both of the technique of the feedback control and the technique of the feedforward control, and the determined energizing current is supplied to each of the pressure-increase linear valve and the pressure-decrease linear valve. The feedback control according to of this form ensures a fairly good control of the braking force.

Unlike the feedforward component determined in the feedforward control, the feedforward component determined in the feedback control of this form is determined according to the preset correlation in the valve equilibrium state on the basis of the actual braking-force index detected by the braking-force index detector. For instance, the pressure-difference-based acting force in a state in which the adjusted pressure corresponding to the actual braking-force index is equal to the valve equilibrium pressure is determined according to a technique similar to that in the feedforward control, and the feedforward component is determined based on the determined pressure-difference-based acting force.

(3) The hydraulic brake system according to the form (1) or (2), wherein the controller is configured to execute the feedback control in a normal condition and is configured to execute the feedforward control in the event of a failure of the braking-force index detector.

As explained above, when the braking-force index detector fails to operate, it is impossible to execute the feedback control by which the braking force can be controlled with relatively high accuracy because the actual braking-force index cannot be detected. According to this form, even in the event of the failure of the braking-force index detector, the braking force can be generated by execution of the feedforward control, so that a system excellent in terms of failsafe can be constructed.

<Limitations Relating to Shifting of Feedforward Component>

In the following forms, there are added limitations relating to shifting of the feedforward component in the feedforward control.

(4) The hydraulic brake system according to any one of the forms (1)-(3),
wherein the controller is configured to detect, in the feedback control, a deviation of an actual relationship between the braking-force index and the energizing current in the valve equilibrium state from the preset relationship, and
wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship between the braking-force index and the energizing current in the valve equilibrium state at the time of occurrence of the detected deviation.

According to this form, the feedforward control is executed based on the deviation of the correlation actually obtained in the feedback control from the preset correlation, whereby the braking force can be controlled in the feedforward control with relatively high accuracy. Where the deviation is detected periodically or successively, the largest one of the detected deviations may be identified, and the feedforward component may be determined according to the correlation at the time of occurrence of the identified deviation.

(5) The hydraulic brake system according to any one of the forms (1)-(3),
wherein the preset relationship between the braking-force index and the energizing current in the valve equilibrium state falls within a preset specified range, and
wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship corresponding to a lower limit of the braking force in the specified range.

In general, a certain degree of tolerance is set for allowing for variations in characteristics of the pressure-increase linear valve and the pressure-decrease linear valve, with consideration given to quality variations which are unavoidable from a manufacturing viewpoint. The correlation in the valve equilibrium state that is preset for each of the pressure-increase linear valve and the pressure-decrease linear valve differs among individual valves. However, the correlations preset for the individual valves fall within a certain range, owing to the tolerance indicated above. This range is referred to as the "specified range". Among the relationships within the specified range, a relationship in which the valve equilibrium pressure is the lowest when a given energizing current is supplied, namely, a relationship in which the braking force is the smallest when a given energizing current is supplied, is referred to as the "relationship corresponding to a lower limit of the braking force". According to this form, in the feedforward control, there is supplied, to the pressure-increase linear valve and/or the pressure-decrease linear valve, an energizing current in an instance in which the feedforward component is determined based on the target braking-force index according to the relationship, namely, an energizing current that enables generation of the largest braking force within the tolerance of the characteristics of the pressure-increase linear valve and/or the pressure-decrease linear valve. This form enables a sufficient braking force to be ensured in the feedforward control.

(6) The hydraulic brake system according to any one of the forms (1)-(3), wherein the preset relationship between the braking-force index and the energizing current in the valve equilibrium state falls within a preset specified range, and wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship that is shifted toward a lower limit of the braking force with respect to a middle of the braking force that is middle of the lower limit and an upper limit of the braking force in the specified range.

In this form, there is determined an energizing current in an instance in which the feedforward component is determined based on the target braking-force index according to a relationship that is shifted toward a lower limit of the braking force with respect to the middle of the specified range. In consequence, the energizing current that enables generation of a relatively large braking force is supplied in the feedforward control to the pressure-increase linear valve and/or the pressure-decrease linear valve. Thus, this form ensures a braking force to some extent.

(7) The hydraulic brake system according to any one of the forms (1)-(6), wherein the controller is configured to determine, when the feedforward control is executed, the energizing current supplied to the at least one of the pressure-increase linear valve and the pressure-decrease linear valve so as to be equal to a value that is shifted, by a given current amount, toward the side on which the braking force is large, as compared with the energizing current in an instance in which the feedforward component is determined according to the preset relationship between the braking-force index and the energizing current in the valve equilibrium state.

According to this form, the energizing current supplied to the pressure-increase linear valve and/or the pressure-decrease linear valve is shifted, by a given current amount, from the energizing current in an instance in which the feedforward component is determined according to the preset correlation, regardless of the value of the target braking-force index. This form enables the braking force to be obtained in the feedforward control by a relatively simple technique.

(8) The hydraulic brake system according to any one of the forms (1)-(7), wherein each of the pressure-increase linear valve and the pressure-decrease linear valve has (A) a valve seat, (B) a valve member configured to be seated on the valve seat so as to effectuate the valve closed state and configured to be separated away from the valve seat so as to effectuate the valve open state, (C) an elastic biasing mechanism configured to bias, by an elastic biasing force, the valve member in one of a direction in which the valve member is seated on the valve seat and a direction in which the valve member is separated away from the valve seat, and (D) an electromagnetic coil configured to generate an electromagnetic acting force by the energizing current supplied thereto and configured to bias the valve member in the other of the direction in which the valve member is seated on the valve seat and the direction in which the valve member is separated away from the valve seat, the valve equilibrium state being effectuated by a balance among the elastic biasing force, the electromagnetic acting force, and a pressure-difference-based acting force that acts on the valve member in dependence on the adjusted pressure, and wherein the controller is configured to determine, in the feedforward control, the energizing current supplied to the at least one of the pressure-increase linear valve and the pressure-decrease linear valve so as to be equal to an energizing current in an instance in which the feedforward component is determined according to a relationship between the braking-force index and the energizing current in the valve equilibrium state when the elastic biasing force is changed to a value different from a preset value.

In each of the pressure-increase linear valve and the pressure-decrease linear valve constructed as described above, the valve equilibrium state is established by a balance among the elastic biasing force, the pressure-difference-based acting force, and the electromagnetic acting force, as explained above. Accordingly, when each of the forces changes, the correlation between the braking-force index and the energizing current in the valve equilibrium state changes. The change in the correlation over time or years largely depends on the elastic biasing force that is intrinsic to each of the pressure-increase linear valve and the pressure-decrease linear valve. It is therefore possible to reasonably determine the energizing current for generating a sufficient braking force by supplying, to the pressure-increase linear valve and/or the pressure-decrease linear valve, the energizing current in an instance in which the feedforward component is determined according to the correlation in which the preset value set for the elastic biasing force is changed.

<Control when Braking Force has Become Excessively Large>

In the feedforward control executed by determining the feedforward component as described above, there may be a possibility that the braking force becomes excessively large. In the following forms, there are added limitations relating to measures to be taken when the braking force has become excessively large.

(9) The hydraulic brake system according to any one of the forms (1)-(8), wherein the controller is configured to judge whether the braking force is larger than a set degree and to change the energizing current supplied to the at least one of the pressure-increase linear valve and the pressure-decrease linear valve to a value that is shifted toward a side on which the braking force is small where it is judged that the braking force is larger than the set degree, in the feedforward control.

According to this form, the feedforward component is returned toward the side on which the braking force is small when the braking force has become excessively large. That is, the feedforward component is shifted toward an opposite side. In short, the energizing current is changed to a value that is closer to an energizing current in an instance in which the feedforward component is determined according to the preset correlation. As a result, an appropriate braking force is generated in the feedforward control.

(10) The hydraulic brake system according to the form (9), wherein the controller is configured such that, when the energizing current supplied to the at least one of the pressure-increase linear valve and the pressure-decrease linear valve is changed to the value that is shifted toward the side on which the braking force is small, the energizing current is changed to the value that is shifted by a current amount smaller than a current amount when shifted toward the side on which the braking force is large, in the feedforward control.

According to this form, the energizing current is determined by returning the feedforward component by a small current amount, in other words, by shifting the feedforward component toward an opposite side by a small current amount. Where the feedforward component is arranged to be returned a plurality of times until the braking force becomes smaller than the set degree, the feedforward component gradually becomes closer to a value that permits an appropriate braking force to be generated.

(11) The hydraulic brake system according to the form (9) or (10), wherein the controller is configured to judge, based on a change in the pressure of the working fluid supplied from the high-pressure-source device, whether the braking force is larger than the set degree, in the feedforward control.

As later explained, the high-pressure-source pressure that is a pressure of the working fluid supplied from the high-pressure-source device is decreased in the braking-force increasing state with an increase in the braking force in a system in which the pressure of the working fluid supplied from the high-pressure-source device is adjusted by the pressure-increase linear valve and the pressure-decrease linear valve and the working fluid whose pressure is adjusted is supplied to the brake device or the master cylinder device or in a system which has a pressure regulator configured to regulate the pressure of the working fluid supplied from the high-pressure-source device to a pressure in accordance with the adjusted pressure that is a pressure adjusted by the pressure-increase linear valve and the pressure-decrease linear valve and in which the working fluid from the pressure regulator is supplied to the brake device or the master cylinder device. As later explained, in the braking-force decreasing state, where the adjusted pressure is lowered by the pressure-decrease linear valve when the pressure-increase linear valve is in the valve equilibrium state, the working fluid from the high-pressure-source device passes through the pressure-increase linear valve due to the lowering of the adjusted pressure. Further, the high-pressure-source pressure is lowered due to the passage of the working fluid through the pressure-increase linear valve. According to this form, such a phenomenon is utilized in the feedforward control, whereby it is judged based on the change in the high-pressure-source pressure whether the braking force is larger than the set degree, namely, whether an appropriate energizing current is being supplied to the pressure-increase linear valve and/or the pressure-decrease linear valve. According to this form, it is easily judge whether the braking force is larger than the set degree by utilizing a high-pressure-source pressure sensor provided in the system, for instance.

<Variations Relating to Hardware Structure of Hydraulic Brake System>

In the following forms, there are added limitations relating to the hardware structure of the system.

(12) The hydraulic brake system according to any one of the forms (1)-(11), further comprising a pressure regulator having a pilot chamber and configured to regulate the pressure of the working fluid supplied from the high-pressure-source device to a pressure in accordance with a pressure of the working fluid in the pilot chamber and to supply the working fluid whose pressure is regulated, wherein the pressure-increase linear valve is disposed between the high-pressure-source device and the pilot chamber for increasing the pressure of the working fluid in the pilot chamber while the pressure-decrease linear valve is disposed between the pilot chamber and a low-pressure source for decreasing the pressure of the working fluid in the pilot chamber, whereby the pressure of the working fluid in the pilot chamber is adjusted to the adjusted pressure, and wherein the brake device is configured to receive the working fluid supplied from the pressure regulator or the working fluid having a pressure in accordance with a pressure of the working fluid supplied from the pressure regulator and to generate the braking force having a magnitude in accordance with the pressure of the received working fluid.

The pressure regulator in this form is the so-called regulator. The system of this form includes a system configured such that the working fluid from the pressure regulator is supplied directly to the brake device and a system configured such that the working fluid from the pressure regulator is supplied to the master cylinder device and the working fluid having a pressure in accordance with the pressure of the working fluid supplied to the master cylinder device is supplied from the master cylinder device to the brake device. In the system of this form, the working fluid whose pressure is adjusted to the adjusted pressure by the pressure-increase linear valve and the pressure-decrease linear valve is not supplied directly to the brake device, but is supplied to the pilot chamber of the pressure regulator. According to the system of this form, the amount of the working fluid that passes through the pressure-increase linear valve and the pressure-decrease linear valve is relatively small, so that the size of each of the pressure-increase linear valve and the pressure-decrease linear valve can be reduced and the hydraulic brake system can be accordingly produced at a relatively low cost.

(13) The hydraulic brake system according to the form (12), further comprising a master cylinder device to which a brake operation member is connected and which is configured to receive the working fluid supplied from the pressure regulator and to supply, to the brake device, the working fluid that is pressurized depending on the pressure of the received working fluid to a pressure in accordance with the pressure of the received working fluid, without depending on a brake operation force applied to the brake operation member by a driver, wherein the hydraulic brake system is configured to permit the brake device to generate the braking force having a magnitude in accordance with the pressure of the working fluid supplied from the master cylinder device to the brake device.

In the hydraulic brake system according to this form, the working fluid from the pressure regulator is not directly supplied to the brake device, but is supplied to the master cylinder device, and the working fluid that is pressurized, in the master cylinder device, in dependence on the pressure of the working fluid supplied to the master cylinder device is supplied to the brake device. In general, the brake operation is input to the master cylinder device. Accordingly, by making some modifications to the structure of the master cylinder device, the master cylinder device may be configured such that, in the event of some failure of the system, the working fluid to be supplied to the brake device is pressurized in dependence on the brake operation force applied to the brake operation member. Alternatively, the master cylinder device may be configured such that the working fluid to be supplied to the brake device is arbitrarily pressurized in dependence on both of the pressure of the working fluid supplied from the pressure regulator and the brake operation force. The thus configured master cylinder device contributes to enhancement of the utility of the system of this form. The master cylinder device in this form is configured to pressurize the working fluid depending on the pressure of the working fluid supplied from the pressure regulator without depending on the brake operation force and to supply the pressurized working fluid to the brake device. Therefore, the system of this form is capable of generating the braking force whose magnitude does not depend on the brake operation, whereby the system of this form is suitable for vehicles on which the regenerative brake system is additionally mounted.

(14) The hydraulic brake system according to any one of the forms (1)-(11), further comprising a master cylinder device to which a brake operation member is connected, the master cylinder device being configured to receive the working fluid whose pressure is adjusted to the adjusted pressure by the pressure-increase linear valve and the pressure-decrease linear valve and configured to supply, to the brake device, the working fluid that is pressurized depending on the pressure of the received working fluid to a pressure in accordance with the pressure of the received working fluid, without depending on a brake operation force applied to the brake operation member by a driver, wherein the hydraulic brake system is configured to permit the brake device to generate the braking force having a magnitude in accordance with the pressure of the working fluid supplied from the master cylinder device to the brake device.

Unlike the system according to the above forms, the hydraulic brake system according to this form is not equipped with the pressure regulator. In the system according to this form, the pressure of the working fluid that is adjusted to the adjusted pressure by the pressure-increase linear valve and the pressure-decrease linear valve is input to the master cylinder device. As in the above form, the master cylinder device may be configured to pressurize the working fluid to be supplied to the brake device in dependence on the brake operation force or may be configured to arbitrarily pressurize the working fluid to be supplied to the brake device in dependence on both of; the pressure of the working fluid adjusted to the adjusted pressure; and the brake operation force. Like the system according to the above forms, the hydraulic brake system according to this form is capable of generating the braking force whose magnitude does not depend on the brake operation, whereby the system according to this form is suitable for vehicles on which the regenerative brake system is additionally mounted.

DESCRIPTION OF EMBODIMENT

There will be hereinafter explained in detail a representative embodiment of the claimable invention with reference to the drawings. It is to be understood that the claimable invention is not limited to the following embodiment and modified examples, and the forms described in FORMS OF INVENTION, but may be embodied with various changes and modifications based on the knowledge of those skilled in the art. It is to be further understood that modified examples of the following embodiment can be provided through the use of technical matters described in the forms described in FORMS OF INVENTION.

Embodiment

<Hardware Structure of the Hydraulic Brake System>

(a) Overall Structure

Figure 1:
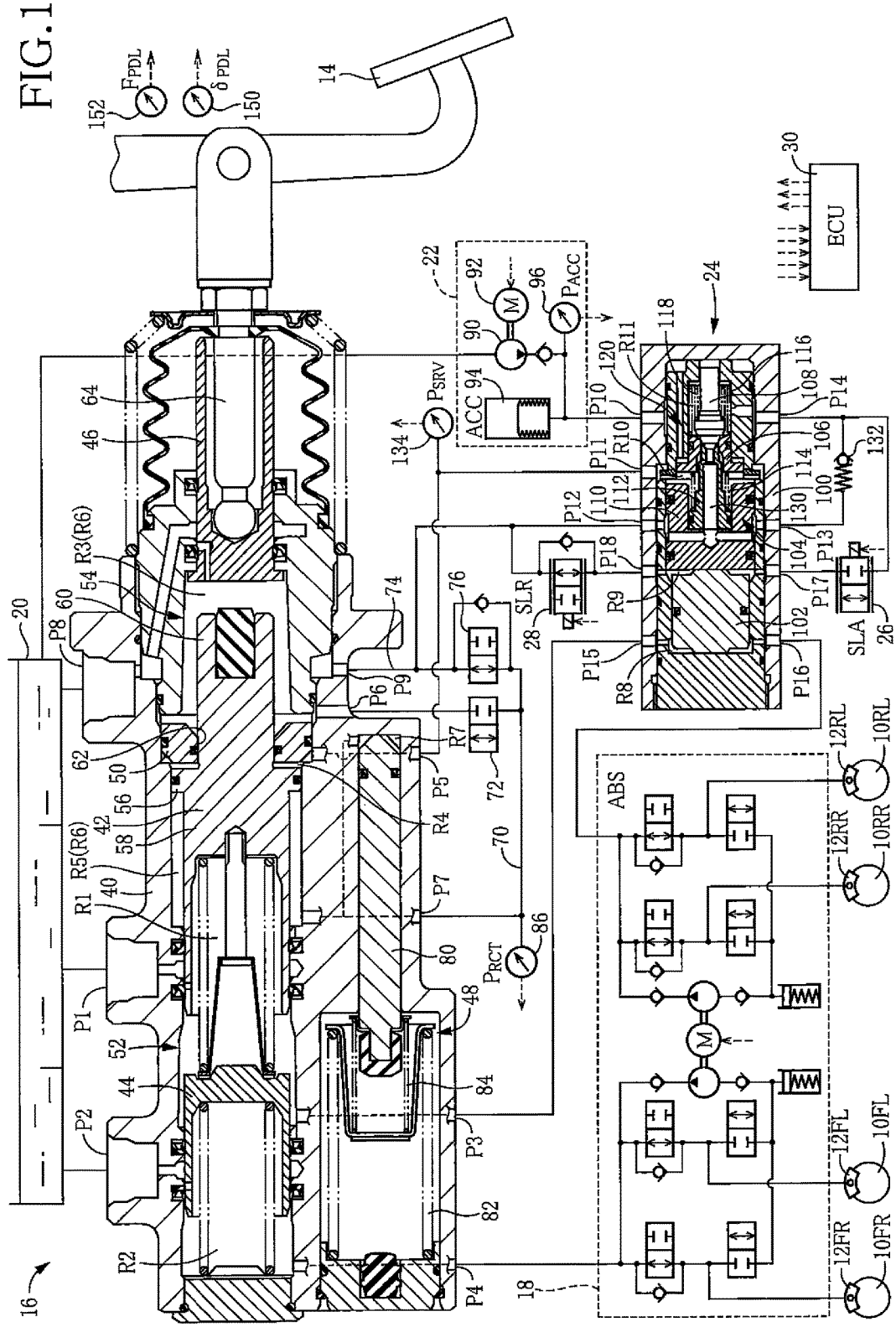
FIG. 1 is a view showing a hardware structure of a hydraulic brake system according to one embodiment of the claimable invention.

A hydraulic brake system according to one embodiment of the claimable invention is a hydraulic brake system that is installed on hybrid vehicles and that uses a brake oil as a working fluid. As shown in FIG. 1, the present hydraulic brake system generally includes (A) four brake devices 12 which are provided for respective four wheels 10 and each of which is configured to generate a braking force, (B) a master cylinder device 16 to which is input an operation of a brake pedal 14 as a brake operation member and which is configured to supply a pressurized working fluid to each brake device 12, (C) an antilock unit 18 disposed between the master cylinder device 16 and the four brake devices 12, (D) a high-pressure-source device 22 configured to pump up the working fluid having an atmospheric pressure from a reservoir 20 as a low-pressure source and to pressurize the pumped fluid, so as to supply the working fluid that is highly pressurized, (E) a regulator 24, as a pressure regulator, configured to regulate a pressure of the working fluid supplied from the high-pressure-source device 22 and to supply, to the master cylinder device 16, the working fluid whose pressure is regulated, (F) an electromagnetic pressure-increase linear valve 26 and an electromagnetic pressure-decrease linear valve 28 (hereinafter simply referred to as "pressure-increase linear valve 26" and "pressure-decrease linear valve 28", respectively, where appropriate) for adjusting a pressure of the working fluid supplied from the regulator 24, and (G) a brake electronic control unit 30, as a controller, configured to control the hydraulic brake system by controlling the devices, equipment, valves, and so on. To the antilock unit 18 (hereinafter referred to as "ABS unit 18" where appropriate), a sign "ABS" is attached in FIG. 1. The pressure-increase linear valve 26 and the pressure-decrease linear valve 28 are respectively marked with signs "SLA" and "SLR" in FIG. 1. The brake electronic control unit 30 may be referred to as "brake ECU 30" where appropriate and is marked with a sign "ECU" in FIG. 1. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish the constituent elements, the same suffixes as used for the wheels 10 are used. For instance, the four brake devices 12 are indicated as 12FR, 12FL, 12RR, and 12RL, respectively, where appropriate.

(b) Brake Devices and ABS Unit

Each of the brake devices 12 provided for the respective wheels 10 is a disc brake device including a disc rotor that rotates together with the wheel 10, a caliper held by a carrier, a wheel cylinder held by the caliper, and brake pads held by the caliper and configured to be moved by the wheel cylinder so as to sandwich the disc rotor. The ABS unit 18 is a unit constituted by four pairs of open/close valves corresponding to the four wheels, a pump device, and so on. One of the open/close valves in each pair is a pressure-increase open/close valve while the other of the open/close valves in each pair is a pressure-decrease open/close valve. The ABS unit 18 is configured to be activated when the wheels 10 are locked due to skidding or the like, so as to prevent the lock of the wheels from being continued. Each brake device 12 and the ABS unit 18 are an ordinary device and an ordinary unit and have low relevance to the features of the claimable invention. Accordingly, a detailed explanation of the brake devices 12 and the ABS unit 18 is dispensed with.

(c) Master Cylinder Device

The master cylinder device 16 is a master cylinder device in which a stroke simulator is integrally incorporated. In general, the master cylinder device 16 has a housing 40 in which two pressurizing pistons, i.e., a first pressurizing piston 42 and a second pressurizing piston 44, and an input piston 46 are disposed, and a stroke simulator mechanism 48 is incorporated in the housing 40. In the following explanation about the master cylinder device 16, a leftward direction and a rightward direction in FIG. 1 are respectively referred to as a forward direction and a rearward direction for the sake of convenience. Similarly, a leftward movement and a rightward movement of the pistons, etc., explained below are respectively referred to as a forward or advancing movement and a rearward or retracting movement.

The housing 40 has a space in which are accommodated the first pressurizing piston 42, the second pressurizing piston 44, and the input piston 46. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a frond-side portion of the front-side chamber 52. The first pressurizing piston 42 has a cylindrical shape having a closed end and includes: a main body portion 58 having a flange 56 formed at a rear end of the main body portion 58; and a protruding portion 60 that extends rearward from the main body portion 58. The main body portion 58 is disposed in the front-side chamber 52 so as to be located rearward of the second pressurizing piston 44. The annular partition portion 50 has an opening 62 at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 is connected to a rear end of the input piston 46 via a link rod 64.

A first pressurizing chamber R1 is formed between the first pressurizing piston 42 and the second pressurizing piston 44, more specifically, on the front side of the main body portion 58 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the brake devices 12FR, 12FL corresponding to the respective two front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50 and a front end of the input piston 46 face to each other, namely, such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is input; and an annular opposing chamber R5. More specifically, the input chamber R4 is formed around an outer circumference of the protruding portion 60 so as to be defined by a front end face of the partition portion 50 and a rear end face of the main body portion 58 of the first pressurizing piston 42, i.e., a rear end face of the flange 56. The opposing chamber R5 is formed forward of the flange 56 around an outer circumference of the main body portion 58 such that the opposing chamber R5 is opposed to the input chamber R4 with the flange 56 interposed therebetween.

The first pressurizing chamber R1 is fluidly communicable with the reservoir 20 via a low-pressure port P1 when the first pressurizing piston 42 is located at a rear end position in its movement range while the second pressurizing chamber R2 is fluidly communicable with the reservoir 20 via a low-pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. In this respect, the first pressurizing chamber R1 communicates with the brake devices 12RR, 12RL also via the regulator 24 (that will be later explained). Further, the input chamber R4 communicates with a regulated-pressure port of the regulator 24 (that will be later explained) via an input port P5.

The inter-piston chamber R3 communicates with a communication port P6 while the opposing chamber R5 communicates with a communication port P7. The communication port P6 and the communication port P7 are connected by an inter-chamber communication passage 70 as an external communication passage. At a certain position in the inter-chamber communication passage 70, there is provided a normally closed electromagnetic open/close valve 72, namely, an open/close valve 72 configured to be closed in a non-energized state and opened in an energized state. When the open/close calve 72 is placed in an open state, the inter-piston chamber R3 and the opposing chamber R5 are brought into communication with each other. In a state in which the inter-piston chamber R3 and the opposing chamber R5 are held in communication with each other, the chambers R3, R5 define one fluid chamber, namely, a fluid chamber that may be referred to as a reaction-force chamber R6 is defined. The electromagnetic open/close valve 72 has a function of switching a communication state of the inter-piston chamber R3 and the opposing chamber R5 between a communicating state and a non-communicating state. In view of this, the electromagnetic open/close valve 72 will be hereinafter referred to as "inter-chamber-communication switching valve 72".

The master cylinder device 16 has two more low-pressure ports P8, P9 that communicate with each other via an internal passage. The low-pressure port P8 is connected to the reservoir 20 while the low-pressure port P9 is connected, between the inter-chamber-communication switching valve 72 and the opposing chamber R5, to the inter-chamber communication passage 70 via a low-pressure release passage 74 as an external communication passage. In the low-pressure release passage 74, there is provided a normally open electromagnetic open/close valve 76, namely, an open/close valve 76 configured to be opened in a non-energized state and closed in an energized state. The open/close valve 76 has a function of releasing the opposing chamber R5 to a low pressure (atmospheric pressure in this system). In view of this, the open/close valve 76 will be hereinafter referred to as "low-pressure release valve 76" where appropriate.

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compressed state). When the input piston 46 moves forward by an operation of the brake pedal 14, the working fluid in the opposing chamber R5, i.e., the working fluid in the reaction-force chamber R6, is introduced into the buffer chamber R7 via an inner passage, and elastic forces of the reaction-force springs 82, 84 in accordance with the introduced amount of the working fluid, namely, in accordance with the amount of the forward movement of the input piston 46, act on the reaction-force chamber R6, whereby an operation reaction force is applied to the brake pedal 14. That is, the stroke simulator mechanism 48 functions as a reaction-force applying mechanism for applying, to the input piston 46, a reaction force against the forward movement of the input piston 46 having a magnitude in accordance with the amount of the forward movement of the input piston 46. The two reaction-force springs 82, 84 are disposed in series, and the reaction-force spring 84 has a spring constant considerably smaller than that of the reaction-force spring 82. Thus, the stroke simulator mechanism 48 is configured to effectuate reaction-force characteristics in which an increase gradient of the reaction force becomes large from a certain point in the progress of the operation of the brake pedal 14 by inhibiting the reaction-force spring 84 from being deformed at the certain point in the progress of the operation of the brake pedal 14. In the present system, there is provided, in the inter-chamber communication passage 70, a reaction-force pressure sensor 86 for detecting a pressure of the working fluid in the reaction-force chamber R6 (reaction-force pressure). (In FIG. 1, the reaction-force pressure sensor 86 is marked with a sign "PncT" indicative of the reaction-force pressure.

In a normal condition, the inter-chamber-communication switching valve 72 is in the open state while the low-pressure release valve 76 is in the closed state, and the reaction-force chamber R6 is defined by the inter-piston chamber R3 and the opposing chamber R5. In the present master cylinder device 16, a pressure receiving area (pressure receiving area with respect to the inter-piston chamber) of the first pressurizing piston 42 on which a pressure of the working fluid in the inter-piston chamber R3 acts for moving the first pressurizing piston 42 forward, namely, an area of a rear end face of the protruding portion 60 of the first pressurizing piston 42, is made equal to a pressure receiving area (pressure receiving area with respect to the opposing chamber) of the first pressurizing piston 42 on which a pressure of the working fluid in the opposing chamber R5 acts for moving the first pressurizing piston 42 rearward, namely, an area of a front end face of the flange 56 of the first pressurizing piston. Accordingly, even if the input piston 46 is moved forward by operating the brake pedal 14, the first pressurizing piston 42 and the second pressurizing piston 44 do not move forward by an operation force, namely, by the pressure in the reaction-force chamber R6, and the working fluid pressurized by the master cylinder device 16 is not supplied to the brake devices 12. On the other hand, when a pressure of the working fluid from the high-pressure-source device 22 is introduced into the input chamber R4, the first pressurizing piston 42 and the second pressurizing piston 44 move forward in dependence on the pressure of the working fluid, and the working fluid pressurized in accordance with a pressure of the working fluid in the input chamber R4 is supplied to the brake devices 12. That is, according to the master cylinder device 16, there is effectuated, in the normal condition, a state in which the braking force is generated depending on the high-pressure-source pressure, namely, a state in which the brake devices 12 generate the braking force having a magnitude that depends on the pressure of the working fluid supplied from the high-pressure-source device 22 to the master cylinder device 16, without depending on the operation force applied to the brake pedal 14.

The vehicle on which the present system is installed is a hybrid vehicle as described above, and a regenerative braking force is accordingly available. Accordingly, it is needed for the brake devices 12 to generate a braking force that corresponds to a difference by subtracting the regenerative braking force from a braking force that is determined based on the brake operation. The present system effectuates the above-indicated state in which the braking force is generated depending on the high-pressure-source pressure, so that the brake devices 12 can generate the braking force that does not depend on the brake operation force. Thus, the present system is a hydraulic brake system suitable for hybrid vehicles.

In the event of an electric failure or the like, on the other hand, the inter-chamber-communication switching valve 72 is in the closed state, the low-pressure release valve 76 is in the open state, and the inter-piston chamber R3 is hermetically closed while the opposing chamber R5 is released to the low pressure (atmospheric pressure in this system). In this state, the operation force applied to the brake pedal 14 is transmitted to the first pressurizing piston 42 via the working fluid in the inter-piston chamber R3, so that the first pressurizing piston 42 and the second pressurizing piston 44 move forward. That is, there is effectuated a state in which the braking force is generated depending on the operation force, namely, a state in which the brake devices 12 generate the braking force having a magnitude that depends on the operation force applied to the brake pedal 14. Where the inter-chamber-communication switching valve 72 is placed in the closed state, the low-pressure release valve 76 is placed in the open state, and the working fluid is introduced from the high-pressure-source device 22 into the input chamber R4, the first pressurizing piston 42 and the second pressurizing piston 44 are moved forward by both of: the pressure of the working fluid supplied from the high-pressure-source device 22 to the master cylinder device 16; and the operation force. As a result, there is effectuated a state in which the braking force is generated depending on the operation force and the high-pressure-source pressure, namely, a state in which the brake devices 12 generate the braking force that depends on both of the operation force and the high-pressure-source pressure, namely, the braking force that is a sum of the braking force whose magnitude depends on the pressure of the working fluid supplied from the high-pressure-source device 22 to the master cylinder device 16 and the braking force whose magnitude depends on the operation force.

(d) High-pressure-source Device

The high-pressure-source device 22 includes: a pump 90 configured to pump up the working fluid from the reservoir 20 and to pressurize the pumped working fluid; a motor 92 for driving the pump 90; and an accumulator 94 (that is marked with a sign "ACC" in FIG. 1) for accumulating the working fluid pressurized by the pump 90. The high-pressure-source device 22 is provided with a high-pressure-source pressure sensor 96 for detecting a pressure of the working fluid in the accumulator 94, namely, for detecting a pressure of the working fluid to be supplied, i.e., the high-pressure-source pressure. (In FIG. 1, the high-pressure-source pressure sensor 96 is marked with a sign "$P_{ACC}$" indicative of the high-pressure-source pressure.

(e) Regulator

The regulator 24 as a pressure regulator includes: a housing 100 having a two-piece structure and an interior space; and a first piston 102, a second piston 104, a ring-shaped valve seat 106, and a valve rod 108 that are disposed in the space of the housing 100 so as to be arranged in this order from the left side in FIG. 1 in the axial direction of the housing 100, i.e., in the left-right direction. Each of the first piston 102 and the second piston 104 functions as a movable member and is movable in the axial direction of the housing 100. The second piston 104 is constituted by a piston main body 110 having a recess and a plunger 112 fitted in the recess. The ring-shaped valve seat 106 is a cylindrical member which has a flange portion and which is open at opposite ends thereof. The ring-shaped valve seat 106 is floatingly supported by two springs 114, 116 with respect to the second piston 104 and the housing 100. A left end portion of the valve rod 108 functions as a valve member. The valve rod 108 is disposed such that the left end portion thereof functioning as the valve member can be seated on a right end portion of the ring-shaped valve seat 106 functioning as a valve seat. The valve rod 108 is biased leftward by a spring 118. That is, the ring-shaped valve seat 106, the valve rod 108, and the spring 118 provide a valve mechanism 120 that is disposed so as to be arranged with the second piston 104, functioning as the movable member, in the axial direction of the housing 100. A distal (right) end of the plunger 112 of the second piston 104 is arranged to be abuttable on the left end portion of the valve rod 108 within the ring-shaped valve seat 106.

A plurality of fluid chambers are formed in the space of the housing 100. More specifically, a first pilot chamber R8 is formed on the left side of the first piston 102. A second pilot chamber R9 is formed between the first piston 102 and the second piston 104. A regulated-pressure chamber R10 is formed around an outer circumference of the plunger 112 of the second piston 104 generally between the piston main body 110 and the flange portion of the ring-shaped valve seat 106. In the regulated-pressure chamber R10, there is accommodated the working fluid whose pressure is regulated and which is supplied from the regulator 24 to the master cylinder device 16. A high pressure chamber R11 for receiving the working fluid supplied from the high-pressure-source device 22 is formed on an outer circumference of the valve rod 108. Roughly, the regulated-pressure chamber R10 is formed on one of opposite sides of the second piston 104 nearer to the valve mechanism 120, and the high pressure chamber R11 and the regulated-pressure chamber R10 sandwich the valve mechanism 120 therebetween.

The housing 100 is provided with various ports, and the fluid chambers described above communicate with various devices of the present system via the ports. To be more specific, the working fluid from the high-pressure-source device 22 is supplied to the high pressure chamber R11 via a high pressure port P10. The regulated-pressure chamber R10 communicates with the input port P5 of the master cylinder device 16 via a regulated-pressure port P11. In the second piston 104, there is formed a low-pressure passage 130 constituted by a fluid passage that penetrates the plunger 112 in the axial direction and a fluid passage that communicates with the above-indicated fluid passage and that penetrates the piston main body 110 in the diametric direction. Two low-pressure ports P12, P13 communicate with each other via the low-pressure passage 130. The low-pressure port P12 is connected to the low-pressure release passage 74, whereby the low-pressure passage 130 communicates with the reservoir 20 via the master cylinder device 16. In other words, the low-pressure passage 130 functions as a low-pressure-source communication passage communicating with the low-pressure source. The low-pressure port P13 is connected, via a relief valve 132, to a high pressure port P14 different from the above-indicated high pressure port P10. When a pressure in the high pressure chamber R11 becomes excessively high, the pressure in the high pressure chamber R11 is released to the reservoir 20.

The first pilot chamber R8 communicates with the output port P3 of the master cylinder device 16 via a first pilot port P15 and communicates with the brake devices 12RR, 12RL for the rear wheels via a first pilot port P16. That is, the first pilot chamber R8 is a part of a passage for the working fluid supplied from the master cylinder device 16 to the brake devices 12RR, 12RL. The second pilot chamber R9 is connected to two second pilot ports P17, P18. The second pilot port P17 is connected to the high pressure port P14 via the pressure-increase linear valve 26 while the second pilot port P18 is connected to the low-pressure release passage 74 via the pressure-decrease linear valve 28. That is, the second pilot chamber R9 is connected to the high-pressure-source device 22 via the pressure-increase linear valve 26 and is connected to the reservoir 20 via the pressure-decrease linear valve 28. As later explained in detail, a pressure of the working fluid in the second pilot chamber R9 is adjusted to a pressure that is adjusted by the pressure-increase linear valve 26 and the pressure-decrease linear valve 28 (hereinafter referred to as "adjusted pressure" where appropriate).

A pressure-difference-based acting force acts on the second piston 104. The pressure-difference-based acting force is a force that depends on a pressure difference between: a pressure of the working fluid in the regulated-pressure chamber R10, namely, a pressure of the working fluid supplied from the regulator 24, that is the so-called supply pressure of the pressure regulator and will be hereinafter referred to as "servo pressure" where appropriate; and a second pilot pressure that is the pressure in the second pilot chamber R9. The second piston 104 is moved in the housing 100 in the axial direction by the pressure-difference-based acting force. While it is actually needed to consider the elastic reaction forces of the springs 114, 116 and so on, in short, the second piston 104 is moved rightward in FIG. 1, namely, toward the valve mechanism 120 when an acting force that depends on the second pilot pressure is dominant over an acting force that depends on the servo pressure. On the other hand, the second piston 104 is moved leftward in FIG. 1, namely, in a direction away from the valve mechanism 120 when the acting force that depends on the servo pressure is dominant over the acting force that depends on the second pilot pressure. Where the second piston 104 is moved rightward, the second piston 104 comes into engagement, at the distal end of the plunger 112, with the valve mechanism 120 and the distal end of the valve rod 108 is separated away from the ring-shaped valve seat 106, whereby the regulated-pressure chamber R10 and the high pressure chamber R11 are brought into communication with each other by the valve mechanism 120. In this case, an opening of the low-pressure passage 130 formed at the distal end of the plunger 112 is closed by the distal end of the valve rod 108, whereby communication between the regulated-pressure chamber R10 and the low-pressure passage 130 is shut off. Where the second piston 104 is moved leftward, on the other hand, the distal end of the plunger 112 of the second piston 104 is disengaged from the valve mechanism 120, whereby communication between the regulated-pressure chamber R10 and the high pressure chamber R11 is shut off. In this case, the opening of the low-pressure passage 130 is not closed by the distal end of the valve rod 108, and the regulated-pressure chamber R10 and the low-pressure passage 130 are brought into communication with each other. Owing to the operation of the regulator 24, the pressure of the working fluid in the regulated-pressure chamber R10 is regulated to a pressure in accordance with the second pilot pressure, namely, a pressure in accordance with the adjusted pressure adjusted by the pressure-increase linear valve 26 and the pressure-decrease linear valve 28. In the present system, there is provided a servo-pressure sensor 134 for detecting the servo pressure. (The servo-pressure sensor 134 is marked, in FIG. 1, with a sign "PsRv" indicative of the servo pressure).

In view of the action of the regulator 24, the regulator 24 may be referred to as "pressure regulator depending on the high-pressure-source pressure" in a sense that the high-pressure-source device 22 functions as a pressure source for both of the servo pressure and the second pilot pressure. The present hydraulic brake system equipped with the pressure regulator may be referred to as "system equipped with the pressure regulator depending on the high-pressure-source pressure".

In the normal condition, the servo pressure introduced from the regulator 24 as the pressure regulator to the master cylinder device 16 is regulated to the pressure in accordance with the adjusted pressure as described above. As is understood from the explanation above, in the normal condition, a pressure of the working fluid supplied from the master cylinder device 16 to the brake devices 12 (hereinafter referred to as "master pressure" where appropriate) becomes equal to a pressure in accordance with the servo pressure. Accordingly, the master pressure becomes equal to the pressure in accordance with the adjusted pressure. Therefore, in the present system, the brake devices 12 generate the braking force whose magnitude depends on the adjusted pressure. In this sense, the present system may be referred to as "pressure adjusting system utilizing linear valves" that generates the braking force whose magnitude depends on the pressure adjusted by the pressure-increase linear valve 26 and the pressure-decrease linear valve 28. In the normal condition, a first pilot pressure that is a pressure in the first pilot chamber R8 becomes equal to the master pressure. However, a ratio between the servo pressure and the master pressure that depends on the structure of the master cylinder device 16 and a ratio between the adjusted pressure and the servo pressure that depends on the structure of the regulator 24 are set such that the first piston 102 does not move rightward in the housing 100 by a pressure-difference-based acting force that acts on the first piston 102 in dependence on a pressure difference between the second pilot pressure that is equal to the adjusted pressure and the first pilot pressure that is equal to the master pressure.

Where the working fluid having the adjusted pressure cannot be supplied to the second pilot chamber R9 due to a failure or the like of the pressure-increase linear valve 26, for instance, the first piston 102 and the second piston 104 move in the housing 100 in the axial direction with the first piston 102 and the second piston 104 being kept in contact with each other, namely, the first piston 102 and the second piston 104 move as a unit, by a pressure-difference-based acting force that acts based on a pressure difference between the master pressure introduced into the first pilot chamber R8 and the servo pressure. As in the normal condition, the valve mechanism 120 switches between: communication between the high pressure chamber R11 and the regulated-pressure chamber R10; and shutting off of the communication and switches between: communication between the low-pressure passage 130 and the regulated-pressure chamber R10; and shutting off of the communication, whereby the working fluid having the servo pressure that is equal to a pressure in accordance with the master pressure is supplied from the regulator 24 to the master cylinder device 16. That is, even in a situation in which the working fluid having the adjusted pressure cannot be supplied to the second pilot chamber R9, the present system can effectuate the above-indicated state in which the braking force is generated depending on the high-pressure-source pressure, namely, the state in which the brake devices 12 generate the braking force whose magnitude depends on the pressure of the working fluid supplied from the high-pressure-source device 22 to the master cylinder device 16, when the high-pressure-source device 22 is properly operating or when a certain extent of the pressure remains in the accumulator 94 even if the high-pressure-source device 22 is not properly operating.

In the present system, the master pressure is arranged to be introduced into the first pilot chamber R8 of the regulator 24. In place of the arrangement, the pressure of the working fluid in the reaction-force chamber R6 or in the inter-piston chamber R3 may be arranged to be introduced. Such an arrangement can also effectuate the above-indicated state in which the braking force is generated depending on the high-pressure-source pressure, namely, the state in which the brake devices 12 generate, in dependence on the pressure of the working fluid supplied from the high-pressure-source device 22, the braking force having a magnitude in accordance with the operation force applied to the brake pedal 14 by the driver, in a situation in which the working fluid having the adjusted pressure cannot be supplied to the second pilot chamber R9.

(f) Pressure-increase Linear Valve and Pressure-decrease Linear Valve

Figure 2:
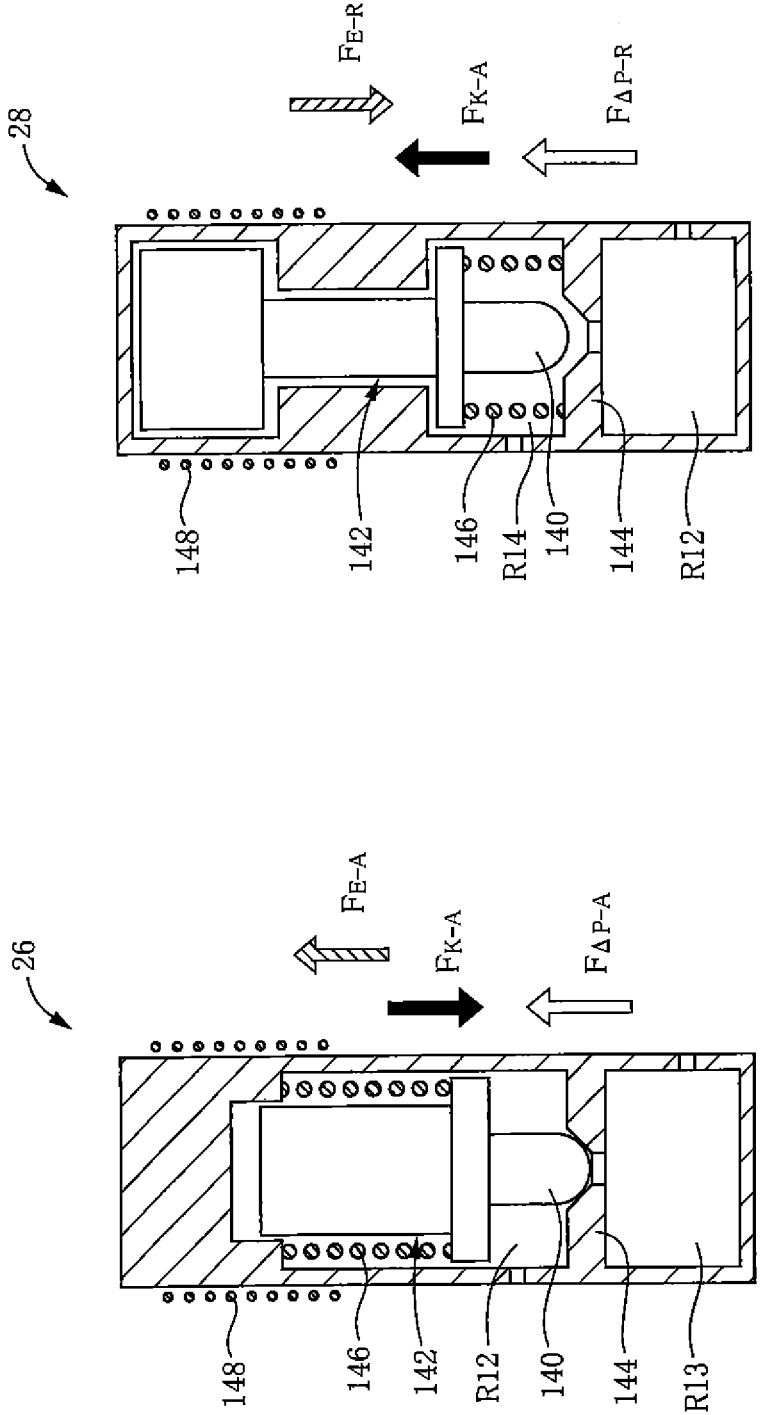
FIGS. 2A and 2B are schematic views respectively showing an electromagnetic pressure-increase linear valve and an electromagnetic pressure-decrease linear valve of the hydraulic brake system.

The pressure-increase linear valve 26 and the pressure-decrease linear valve 28 are ordinary electromagnetic linear valves and have respective structures schematically shown in FIGS. 2A and 2B. The pressure-increase linear valve 26 is a normally closed electromagnetic linear valve disposed between the high-pressure-source device 22 and the second pilot chamber R9 of the regulator 24. As shown in FIG. 2A, the pressure-increase linear valve 26 has a plunger 142 whose distal end 140 functions as a valve member and a valve seat 144 on which the distal end 140 of the plunger 142 is seated. In the pressure-increase linear valve 26, there is formed: an adjusted-pressure chamber R12 which is located on one of opposite sides of the valve seat 144 that is nearer to the plunger 142 and which communicates with the second pilot chamber R9 of the regulator 24 for accommodating the working fluid having an adjusted pressure $P_{AJT}$ corresponding to a second pilot pressure $P_{PLT}$ of the second pilot chamber R9; and a high-pressure chamber R13 which is located on the other of the opposite sides of the valve seat 144 that is remote from the plunger 142 and which communicates with the high-pressure-source device 22 for receiving the working fluid having a high-pressure-source pressure $P_{ACC}$. There acts, on the plunger 142, a pressure-difference-based acting force $F\Delta_{P'A}$ based on a pressure difference between the high-pressure-source pressure $P_{ACC}$ and the adjusted pressure $P_{AJT}$, in a direction in which the plunger 142 is separated away from the valve seat 144. At the same time, the plunger 142 is biased in a direction in which the plunger 142 is seated on the valve seat 144, by a biasing force of a spring 146 that is larger than the pressure-difference-based acting force $F\Delta_{P'A}$, namely, an elastic biasing force $F_{K'A}$ generated by an elastic biasing mechanism that includes the spring 146. By energization of an electromagnetic coil 148, there also acts, on the plunger 142, an electromagnetic acting force $F_{E'A}$ having a magnitude in accordance with an energizing current $I_A$ supplied to the coil 148 in the same direction as the pressure-difference-based acting force $F\Delta_{P'A}$, namely, in a direction opposite to the elastic biasing force $F_{K'A}$. Roughly, in the present pressure-increase linear valve 26, the energizing current $I_A$ is determined such that an arbitrary adjusted pressure $P_{AJT}$ is obtained while considering a balance among the pressure-difference-based acting force $F\Delta_{P'A}$, the electromagnetic acting force $F_{E'A}$, and the elastic biasing force $F_{K'A}$, and the determined energizing current is given to the coil 148. The determination of the energizing current $I_A$ will be later explained in detail. It is noted that, in the pressure-increase linear valve 26, the adjusted pressure $P_{AJT}$ increases with an increase in the energizing current $I_A$. In other words, a valve opening degree (e.g., a degree of ease with which the state of the valve changes from a valve closed state to a valve open state) becomes higher, and a valve opening pressure in a state in which the elastic biasing force $F_{K'A}$, the pressure-difference-based acting force $F\Delta_{P'A}$, and the electromagnetic acting force $F_{E'A}$ are balanced with one another becomes higher. In other words, a valve opening pressure in a valve equilibrium state that is a boundary state between the valve open state and the valve closed state, i.e., a valve equilibrium pressure, becomes higher, with an increase in the energizing current $I_A$.

The pressure-decrease linear valve 28 is a normally open electromagnetic linear valve disposed between the second pilot chamber R9 of the regulator 24 and the reservoir 20 as the low-pressure source. As shown in FIG. 2B, the pressure-decrease linear valve 28 has a plunger 142 whose distal end 140 functions as a valve member and a valve seat 144 on which the distal end 140 of the plunger 142 is seated. In the pressure-decrease linear valve 28, there are formed: a low-pressure chamber R14 which is located on one of opposite sides of the valve seat 144 that is nearer to the plunger 142 and which communicates with the reservoir 20 so as to have an atmospheric pressure $P_{RSV}$; and an adjusted-pressure chamber R12 which is located on the other of the opposite sides of the valve seat 144 that is remote from the plunger 142 and which communicates with the second pilot chamber R9 of the regulator 24 for accommodating the working fluid having the adjusted pressure $P_{AJT}$ corresponding to the second pilot pressure $P_{PLT}$. There acts, on the plunger 142, a pressure-difference-based acting force $F\Delta_{P'R}$ based on a pressure difference between the adjusted pressure $P_{AJT}$ and the atmospheric pressure $P_{RSV}$, in a direction in which the plunger 142 is separated away from the valve seat 144. At the same time, the plunger 142 is biased by a biasing force of the spring 146, namely, by an elastic biasing force $F_{K'R}$ generated by an elastic biasing mechanism that includes a spring 146, in the same direction as the pressure-difference-based acting force $F\Delta_{P'R}$. By energization of an electromagnetic coil 148, there also acts, on the plunger 142, an electromagnetic acting force $F_{E'R}$ having a magnitude in accordance with an energizing current $I_R$ supplied to the coil 148 in a direction opposite to the pressure-difference-based acting force $F\Delta_{P'R}$ and the elastic biasing force $F_{K'R}$. Roughly, in the present pressure-decrease linear valve 28, the energizing current $I_R$ is determined such that an arbitrary adjusted pressure $P_{AJT}$ is obtained while considering a balance among the pressure-difference-based acting force $F\Delta_{P'R}$, the elastic biasing force $F_{K'R}$, and the electromagnetic acting force $F_{E'R}$, and the determined energizing current is supplied to the coil 148. The determination of the energizing current $I_R$ will be later explained in detail, as in the pressure-increase linear valve 26. It is noted that, in the pressure-decrease linear valve 28, the adjusted pressure $P_{AJT}$ increases with an increase in the energizing current $I_R$. In other words, a valve opening degree (e.g., a degree of ease with which the state of the valve changes from the valve closed state to the valve open state) becomes lower, and a valve opening pressure in the valve equilibrium state, i.e., a valve equilibrium pressure becomes higher, with an increase in the energizing current $I_R$.

From the viewpoint of the functions of the pressure-increase linear valve 26 and the pressure-decrease linear valve 28 described above, in the present system, the pressure-increase linear valve 26 and the pressure-decrease linear valve 28 provide a pressure adjusting valve device that adjusts the pressure of the working fluid to the adjusted pressure $P_{AJT}$. The pressure adjusting valve device is configured to adjust the second pilot pressure $P_{PLT}$ of the regulator 24 as the adjusted pressure $P_{AJT}$.

(g) Control System

A control of the present system, namely, a brake control, is executed by the brake ECU 30. Roughly, the brake ECU 30 controls the high-pressure-source device 22, specifically, the brake ECU 30 controls the motor 92 of the high-pressure-source device 22, and further controls the pressure-increase linear valve 26 and the pressure-decrease linear valve 28. The brake ECU 30 is constituted by a computer as a main element and drive circuits (drivers) for driving the motor 92 of the high-pressure-source device 22, the pressure-increase linear valve 26, and the pressure-decrease linear valve 28 and so on, respectively.

To the brake ECU 30, the following sensors are connected: the reaction-force pressure sensor 86 for detecting a pressure $P_{RCT}$ in the reaction-force chamber R6 or in the opposing chamber R5 (hereinafter referred to as "reaction-force pressure $P_{RCT}$" where appropriate); the high-pressure-source pressure sensor 96 for detecting the high-pressure-source pressure $P_{ACC}$ (the so-called "accumulator pressure") that is a pressure of the working fluid supplied from the high-pressure-source device 22 to the regulator 24; and a servo-pressure sensor 134 for detecting the servo pressure $P_{SRV}$, as a supply pressure of the pressure regulator, that is a pressure the working fluid supplied from the regulator 24 to the master cylinder device. The pressures $P_{RCT}$, $P_{ACC}$, $P_{SRV}$ are obtained as information necessary for the control. The servo pressure $P_{SRV}$, as the supply pressure of the pressure regulator, that is the pressure of the working fluid supplied from the regulator 24 is one kind of a braking-force index indicative of the braking force to be generated by the brake devices 12. Accordingly, the servo-pressure sensor 134 functions as a braking-force index detector. Further, the present system is provided with a brake operation amount sensor 150 for detecting a brake operation amount $\delta_{PDL}$ and a brake operation force sensor 152 for detecting a brake operation force $F_{PDL}$, as operation information of the brake pedal 14 as the brake operation member. (In FIG. 1, the brake operation amount sensor 150 and the brake operation force sensor 152 are respectively marked with a sign "$\delta_{PDL}$" indicative of the brake operation amount and a sign "$F_{PDL}$" indicative of the brake operation force. These sensors 150, 152 are also connected to the brake ECU 30. The control in the present system is executed based on the values detected by the sensors.

<Control and Processing in Hydraulic Brake System>

Hereinafter, the brake control in the present system will be explained with reference to a program therefor following flows of the program. In the control following the program, there are executed: a control of the high-pressure-source device 22, i.e., a high-pressure-source control that is a control of the high-pressure-source pressure $P_{ACC}$; and a braking-force control for controlling the braking force to be generated by the brake devices 12 by controlling the energizing currents $I_A$, $I_R$ supplied to the pressure-increase linear valve 26 and the pressure-decrease linear valve 28, respectively. In the braking-force control, a feedback control is executed in a normal condition while a feedforward control is executed in the event of a failure of the servo-pressure sensor 134. While taking this into account, there will be explained, in order, a main flow of the brake control, the high-pressure-source control, the normal-condition braking-force control, the feedforward control, and the braking-force control in the event of the failure of the servo-pressure sensor, for easier understanding of the present brake control. Thereafter, there will be explained a functional structure of the brake ECU 30, i.e., the controller, relating to the brake control.

(a) Main Flow of Brake Control

Figure 3:
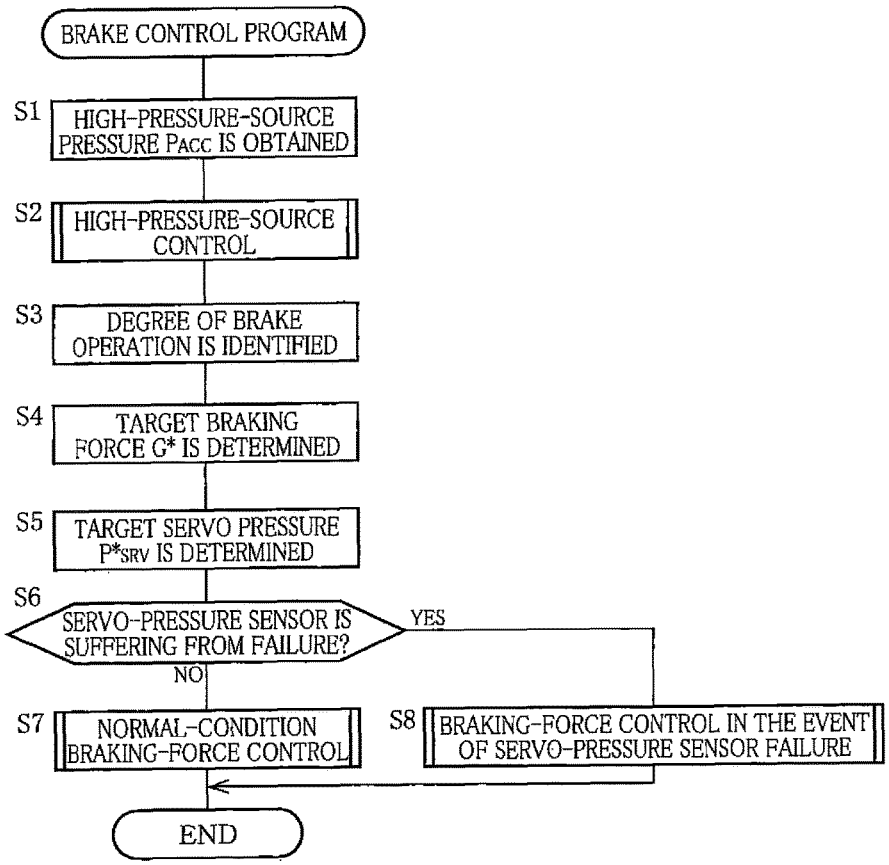
FIG. 3 is a flow chart representing a brake control program executed by a brake electronic control unit (ECU) of the hydraulic brake system of FIG. 1.

The brake control is executed for permitting the brake devices 12 to generate an appropriate braking force. The brake control is executed such that the brake ECU 30 repeatedly executes a brake control program represented by a flow chart of FIG. 3 at a short time pitch, e.g., from several msec to several tens of msec.

In the control processing according to this program, initially, at Step 1 (hereinafter abbreviated as "S1" and other steps will be similarly abbreviated), a high-pressure-source pressure $P_{ACC}$ is obtained based on detection by the high-pressure-source pressure sensor 96. There is subsequently executed at S2 the control of the high-pressure-source device 22, i.e., the high-pressure-source control, that will be later explained in detail. The high-pressure-source control is for controlling the high-pressure-source pressure $P_{ACC}$ that is a pressure of the working fluid supplied from the high-pressure-source device 22.

At S3 that follows the high-pressure-source control, the degree of the brake operation is identified, according to a known technique, based on the brake operation amount $\delta_{PDL}$ and the brake operation force $F_{PDL}$ detected by the brake operation amount sensor 150 and the brake operation force sensor 152, respectively. Next, at S4, a target braking force G* is determined based on the degree of the brake operation identified as described above. The target braking force G* is a braking force required for the present hydraulic brake system, namely, a braking force that should be generated by the four brake devices 12. To be more specific, there is initially calculated, based on the identified degree of the brake operation, a required total braking force that is a braking force required for the vehicle as a whole. Subsequently, the target braking force G* is determined by subtracting, from the required total braking force, a regenerative braking force that is generated at a current time point. There is subsequently determined, at S5, a target braking-force index, namely, a target servo pressure $P^*_{SRV}$ that is a target in the control of the servo pressure $P_{SRV}$ as a target of the braking-force index in the control, based on the determined target braking force G*. More specifically, the target servo pressure $P^*_{SRV}$ is calculated from the target braking force G* on the basis of a ratio among: a pressure receiving area of the piston of the wheel cylinder of each brake device 12; a pressure receiving area of the first pressurizing piston 42 with respect to the input chamber R4 of the master cylinder device 16; a pressure receiving area of the first pressurizing piston 42 with respect to the first pressurizing chamber R1; and a pressure receiving area of the second pressurizing piston 44 with respect to the second pressurizing chamber R2.

After the target servo pressure $P^*_{SRV}$ is determined, it is judged at S6 whether the servo-pressure sensor 134 is suffering from a failure. Where it is judged that the servo-pressure sensor is not suffering from any failure, the normal-condition braking-force control is executed at S7. Where it is judged that the servo-pressure sensor is suffering from a failure, the braking-force control in the event of servo-pressure sensor failure is executed at S8.

(b) High-pressure-source Control

Figure 4:
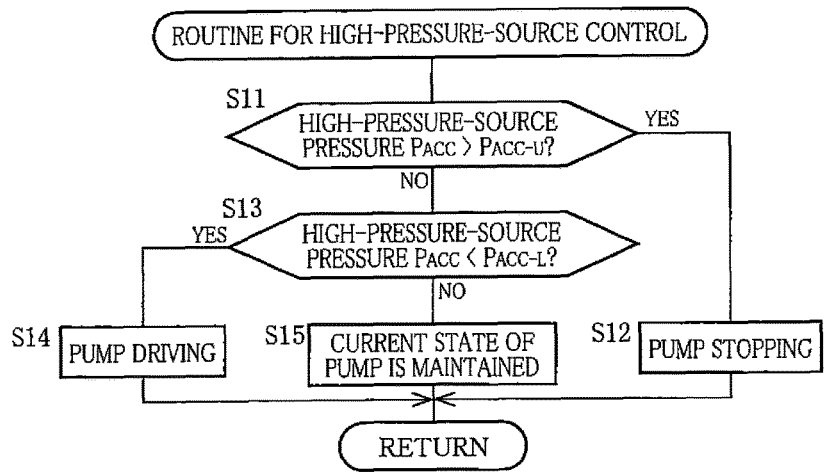
FIG. 4 is a flow chart representing a routine for a high-pressure-source control that is a part of the brake control program.

The high-pressure-source control of S2 is a control for regulating the high-pressure-source pressure $P_{ACC}$. The high-pressure-source control is executed by execution of a routine for the high-pressure-source control represented by a flow chart of FIG. 4. In processing according to this routine, it is judged at S11 whether the high-pressure-source pressure $P_{ACC}$ is over a set upper-limit pressure $P_{ACC-U}$. Where it is judged that the high-pressure-source pressure $P_{ACC}$ is over the set upper-limit pressure $P_{ACC-U}$, there is issued at S12 a command to stop the pump 90. More specifically, a command to stop the motor 92 is sent to the drive circuit. On the other hand, where it is judged that the high-pressure-source pressure $P_{ACC}$ is not over the set upper-limit pressure $P_{ACC-U}$, it is judged at 513 whether the high-pressure-source pressure $P_{ACC}$ is below a set lower-limit pressure $P_{ACC-L}$. Where it is judged that the high-pressure-source pressure $P_{ACC}$ is below the set lower-limit pressure $P_{ACC-L}$, there is issued at S14 a command to drive the pump 90. More specifically, a command to activate the motor 92 is sent to a motor driver. On the other hand, where it is judged that the high-pressure-source pressure $P_{ACC}$ is not below the set lower-limit pressure $P_{ACC-L}$, namely, where the high-pressure-source pressure $P_{ACC}$ is not lower than the set lower-limit pressure $P_{ACC-L}$ and is not higher than the set upper-limit pressure $P_{ACC-U}$, there is issued at S15 a command to maintain the current state of the pump 90. In other words, a command to maintain driving of the pump 90 is issued when the pump 90 is being driven while a command to maintain stopping of the pump 90 is issued when the pump 90 is at rest. More specifically, a command to activate the motor 92 is sent to the drive circuit when the motor 92 is being activated while a command to stop the motor 92 is sent to the drive circuit when the motor 92 is at rest. By execution of the high-pressure-source control described above, the high-pressure-source pressure $P_{ACC}$ is maintained within a set pressure range defined by the set upper-limit pressure $P_{ACC-U}$ and the set lower-limit pressure $P_{ACC-L}$.

(c) Normal-condition Braking-force Control

Figure 5:
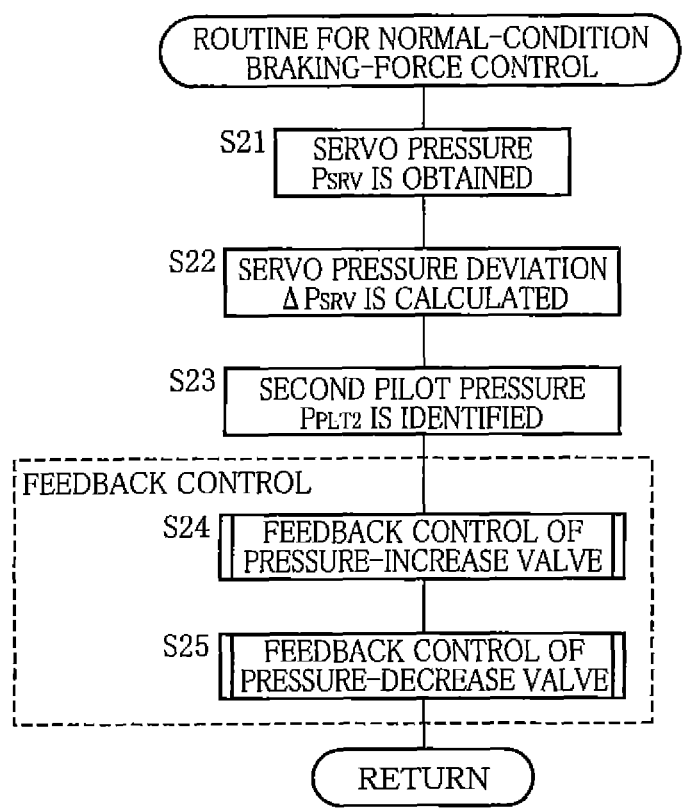
FIG. 5 is a flow chart representing a routine for a normal-condition braking-force control that is a part of the brake control program.

The normal-condition braking-force control of S7 is executed by execution of a routine for the normal-condition braking-force control represented by a flow chart of FIG. 5. In processing according to this routine, there is obtained at S21 an actual servo pressure $P_{SRV}$ as an actual braking-force index, based on detection by the servo-pressure sensor 134. Subsequently, at S22, a servo-pressure deviation $\Delta P_{SRV}$ ($= P^*_{SRV} - P_{SRV}$) is calculated by subtracting the obtained servo pressure $P_{SRV}$ from the already determined target servo pressure $P^*_{SRV}$. Then at S23, a second pilot pressure $P_{PLT2}$ that is a pressure of the working fluid in the second pilot chamber R9 is identified based on the servo pressure $P_{SRV}$ obtained as described above and a pressure increase ratio, i.e., a ratio of the servo pressure to the pilot pressure, determined by the structure of the regulator 24. Thereafter, a feedback control of the pressure-increase valve is executed at S24 in which the pressure-increase linear valve 26 is controlled by the energizing current $I_A$ supplied thereto, and a feedback control of the pressure-decrease valve is executed at S25 in which the pressure-decrease linear valve 28 is controlled by the energizing current $I_R$ supplied thereto. The feedback control of the pressure-increase valve and the feedback control of the pressure-decrease valve constitute the feedback control.

c-1) Feedback Control of Pressure-increase Valve

Figure 6:
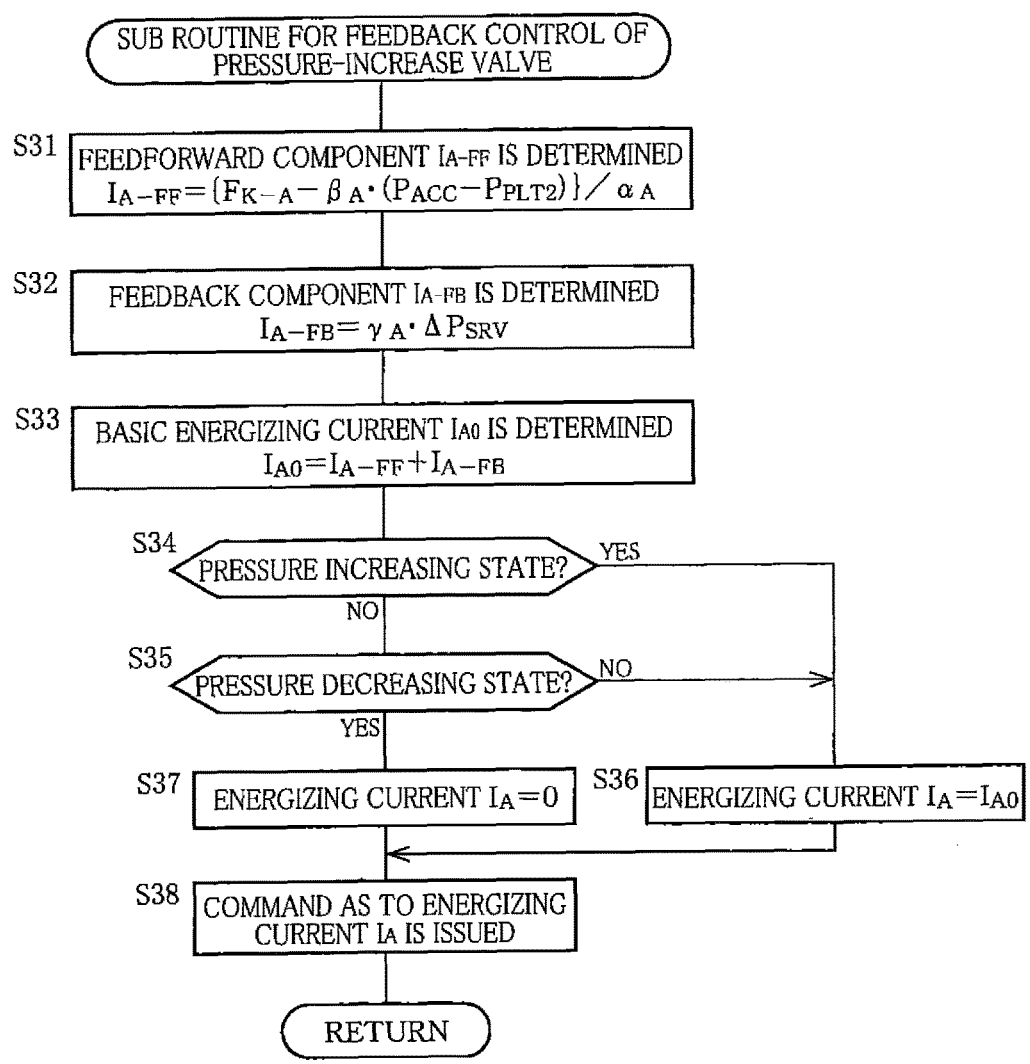
FIG. 6 is a flow chart representing a sub routine for a feedback control of the pressure-increase valve that is a part of the routine for the normal-condition braking-force control.

In the feedback control of the pressure-increase valve of S24, the energizing current $I_A$ is determined by adding a feedback component $I_{A-FB}$ that is a current component determined according to the technique of the feedback control to a feedforward component $I_{A-FF}$ that is a current component determined according to the technique of the feedforward control, and the determined energizing current $I_A$ is supplied to the pressure-increase linear valve 26. The feedback control of the pressure-increase valve is executed by execution of a sub routine for the feedback control of the pressure-increase valve represented by a flow chart of FIG. 6.

In processing according to the sub routine for the feedback control of the pressure-increase valve, the feedforward component $I_{A-FF}$ is initially determined at S31 according to a correlation between the servo pressure $P_{SRV}$ and the energizing current $I_A$ in the valve equilibrium state that is determined in dependence on the structure of the pressure-increase linear valve 26. That is, the feedforward component $I_{A-FF}$ is regarded as a component for placing the pressure-increase linear valve 26 in the valve equilibrium state that is a boundary state between the valve open state and the valve closed state. The servo pressure $P_{SRV}$ and the second pilot pressure $P_{PLT2}$ (corresponding to the adjusted pressure $P_{AJT}$) have a relationship according to the pressure increase ratio described above. Accordingly, the feedforward component $I_{A-FF}$ is actually determined according to a correlation among the second pilot pressure $P_{PLT2}$, the high-pressure-source pressure $P_{ACC}$, and the energizing current $I_A$. As apparent from FIG. 2A, a balance among the pressure-difference-based acting force $F\Delta_{P-A}$, the elastic biasing force $F_{K-A}$, and the electromagnetic acting force $F_{E-A}$ in the valve equilibrium state is represented by the following expression:

$$F_{E-A} = F_{K-A} - F\Delta_{P-A}$$

In this respect, where the energizing current in the valve equilibrium state is $I_{A-FF}$, the following expressions are established:

$$F_{E-A} = \alpha_A \cdot I_{A-FF}$$

$$F\Delta_{P-A} = \beta_A \cdot (P_{ACC} - P_{PLT2}) \alpha_A, \beta_A : \text{coefficients}$$

Accordingly, the above expressions are rewritten as follows:

$$I_{A-FF} = \{F_{K-A} - \beta_A \cdot (P_{ACC} - P_{PLT2})\} / \alpha_A$$

("$F_{K-A}$" is regarded as a constant.)

At S31, the energizing current $I_{A-FF}$ obtained from the above expression is determined as the feedforward component $I_{A-FF}$. In determination of the feedforward component $I_{A-FF}$ in the feedback control of the pressure-increase valve, an actual pressure that is already obtained based on detection by the high-pressure-source pressure sensor 96 is used as the high-pressure-source pressure $P_{ACC}$, and a pressure identified in dependence on the actual servo pressure $P_{SRV}$ that is already obtained based on detection by the servo-pressure sensor 134 is used as the second pilot pressure $P_{PLT2}$. The elastic biasing force $F_{K-A}$ is set in advance for individual pressure-increase linear valves 26 based on actual measurement at the time of manufacture of the vehicles. Accordingly, the correlation described above is a preset relationship.

Subsequently, at S32, the feedback component $I_{A-FB}$ is determined based on the servo-pressure deviation $\Delta P_{SRV}$. The feedback component $I_{A-FB}$ is regarded as a current component for making the servo pressure $P_{SRV}$ closer to the target servo pressure $P^*_{SRV}$, namely, a component for lessening the servo-pressure deviation $\Delta P_{SRV}$. More specifically, the feedback component $I_{A-FB}$ is determined according to the following expression:

$$I_{A-FB} = \gamma_A \cdot \Delta P_{SRV} = \gamma_A \cdot (P^*_{SRV} - P_{SRV}) \quad \gamma_A: \text{control gain}$$

In determination of the feedback component $I_{A-FB}$ of the feedback control of the pressure-increase valve, the servo-pressure deviation $\Delta P_{SRV}$ is used which is calculated in dependence on the actual servo pressure $P_{SRV}$ that is already obtained based on detection by the servo-pressure sensor 134.

Next, at S33, a basic energizing current $I_{A0}$ that is a basis of the energizing current $I_A$ to be actually supplied is determined according to the following expression:

$$I_{A0} = I_{A-FF} + I_{A-FB}$$

At S34 and S35, it is judged, based on a change in the target servo pressure $P^*_{SRV}$, whether the hydraulic brake system is in: (A) a braking-force increasing state in which the braking force is being increased; (B) a braking-force decreasing state in which the braking force is being decreased; or (C) a braking-force constant state in which the braking force is maintained (i.e., a state in which the target braking force does not change). Where it is judged that the hydraulic brake system is in the braking-force increasing state or in the braking-force constant state, the energizing current $I_A$ to be supplied is determined to be equal to the basic energizing current $I_{A0}$ at S36. On the other hand, where it is judged that the hydraulic brake system is in the braking-force decreasing state, the energizing current $I_A$ is determined to be equal not to the basic energizing current $I_{A0}$ but to 0, at S37, in terms of power consumption of the pressure-increase linear valve 26. Subsequently, a command as to the determined energizing current $I_A$ is issued at S38. More specifically, a command as to the energizing current $I_A$ is sent to the drive circuit. In the flow chart, the braking-force increasing state, the braking-force constant state, and the braking-force decreasing state are respectively indicated as a pressure increasing state, a pressure constant state, and a pressure decreasing state, focusing on the change in the servo pressure $P_{SRV}$.

In the feedback control of the pressure-increase valve, the basic energizing current $I_{A0}$ is supplied to the pressure-increase linear valve 26 in the braking-force increasing state and in the braking-force constant state. Accordingly, in a strict sense, the feedback control is executed only in the braking-force increasing state and in the braking-force constant state.

c-2) Feedback Control of Pressure-decrease Valve

Figure 7:
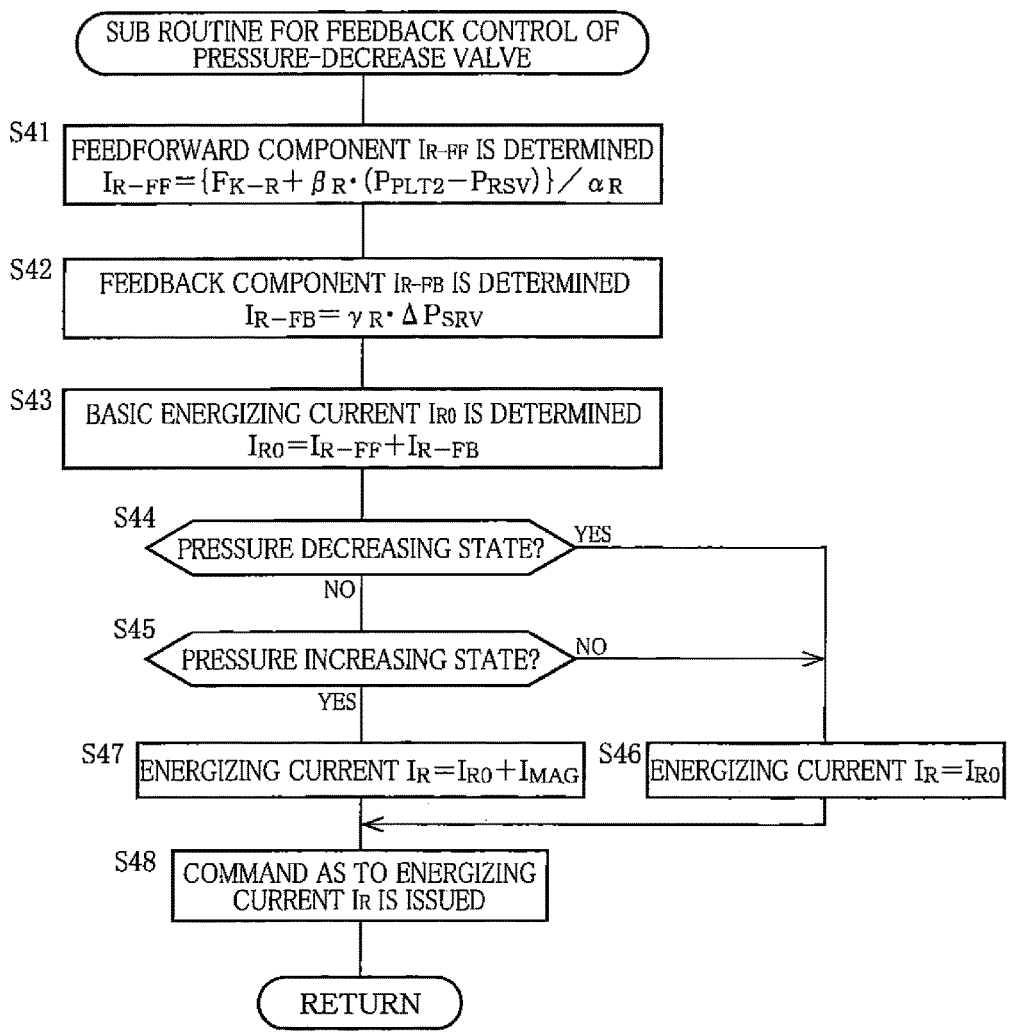
FIG. 7 is a flow chart representing a sub routine for a feedback control of the pressure-decrease valve that is a part of the routine for the normal-condition braking-force control.

As in the feedback control of the pressure-increase linear valve 26, in the feedback control of the pressure-decrease valve of S25, the energizing current $I_R$ is determined by adding a feedback component $I_{R-FB}$ to a feedforward component $I_{R-FF}$, and the determined energizing current $I_R$ is supplied to the pressure-decrease linear valve 28. The feedback control of the pressure-decrease valve is executed by execution of a sub routine for the feedback control of the pressure-decrease valve represented by a flow chart of FIG. 7.

As in the processing for the pressure-increase linear valve 26, in processing according to the sub routine for the feedback control of the pressure-decrease valve, the feedforward component $I_{R-FF}$ is initially determined at S41 according to a correlation between the servo pressure $P_{SRV}$ and the energizing current $I_R$ in the valve equilibrium state that is determined in dependence on the structure of the pressure-decrease linear valve 28. That is, the feedforward component $I_{R-FF}$ is regarded as a component for placing the pressure-decrease linear valve 28 in the valve equilibrium state that is a boundary state between the valve open state and the valve closed state. The servo pressure $P_{SRV}$ and the second pilot pressure $P_{PLT2}$ have a relationship according to the pressure increase ratio described above. Accordingly, the feedforward component $I_{R-FF}$ is actually determined according to a correlation among the second pilot pressure $P_{PLT2}$, the atmospheric pressure $P_{RSV}$, and the energizing current $I_R$. As apparent from FIG. 2B, a balance among the pressure-difference-based acting force $F_{AP-R}$, the elastic biasing force $F_{K-R}$, and the electromagnetic acting force $F_{E-R}$ in the valve equilibrium state is represented by the following expression:

$$F_{E-R} = F_{K-R} + F\Delta_{P-R}$$

In this respect, where the energizing current in the valve equilibrium state is $I_{R-FF}$, the following expressions are established:

$$F_{E-R} = \alpha_R \cdot I_{R-FF}$$

$$F\Delta_{P-R} = \beta_R \cdot (P_{PLT2} - P_{RSV}) \quad \alpha_R, \beta_R: \text{coefficients}$$

Accordingly, the above expressions are rewritten as follows:

$$I_{R-FF} = \{F_{K-R} + \beta_R \cdot (P_{PLT2} - P_{RSV})\}/\alpha_R$$

("$F_{K-R}$" is regarded as a constant.)

At S41, the energizing current $I_{R-FF}$ obtained from the above expression is determined as the feedforward component $I_{R-FF}$. In determination of the feedforward component $I_{R-FF}$ in the feedback control of the pressure-decrease valve, about 1 atmospheric pressure is used as the atmospheric pressure $P_{RSV}$, and a pressure identified in dependence on the actual servo pressure $P_{SRV}$ that is already obtained based on detection by the servo-pressure sensor 134 is used as the second pilot pressure $P_{PLT2}$. The elastic biasing force $F_{K-R}$ is set in advance for individual pressure-decrease linear valves 28 based on actual measurement at the time of manufacture of the vehicles. Accordingly, the correlation described above is a preset relationship.

Subsequently, at S42, the feedback component $I_{R-FB}$ is determined based on the servo-pressure deviation $\Delta P_{SRV}$. The feedback component $I_{R-FB}$ is regarded as a current component for making the servo pressure $P_{SRV}$ closer to the target servo pressure $P^*_{SRV}$, namely, a component for lessening the servo-pressure deviation $\Delta P_{SRV}$. More specifically, the feedback component $I_{R-FB}$ is determined according to the following expression:

$$I_{R-FB} = \gamma_R \cdot \Delta P_{SRV} = \gamma_R \cdot (P^*_{SRv} - P_{SRV}) \quad \gamma_R: \text{control gain}$$

In determination of the feedback component $I_{R-FB}$ in the feedback control of the pressure-decrease valve, the servo-pressure deviation $\Delta P_{SRV}$ is used which is calculated in dependence on the actual servo pressure $P_{SRV}$ that is already obtained based on detection by the servo-pressure sensor 134.

Next, at S43, a basic energizing current $I_{R0}$ that is a basis of the energizing current $I_R$ to be actually supplied is determined according to the following expression:

$$I_{R0}=I_{R-FF}+I_{R-FB}$$

In the case of the pressure-decrease linear valve 28, the feedback component $I_{R-FB}$ is a negative value because the actual servo pressure $P_{SRV}$ is higher than the target servo pressure $P^*_{SRV}$ in the braking-force decreasing state and the servo-pressure deviation $\Delta P_{SRV}$ accordingly becomes a negative value. In consequence, the feedback component $I_{R-FB}$ is a component for reducing the feedforward component $I_{R-FF}$. At S44 and S45, it is judged, based on a change in the target servo pressure $P^*_{SRV}$, whether the hydraulic brake system is in: (A) the braking-force increasing state; (B) the braking-force decreasing state; or (C) the braking-force constant state. Where it is judged that the vehicle is in the braking-force decreasing state or in the braking-force constant state, the energizing current $I_R$ to be supplied is determined to be equal to the basic energizing current $I_{R0}$ at S46. On the other hand, where the hydraulic brake system is in the braking-force increasing state, the energizing current $I_R$ is determined to be equal to a current that is a sum of the basic energizing current $I_{R0}$ and a margin current $I_{MAG}$, at S47, for placing the pressure-decrease linear valve 28 sufficiently in the valve closed state. Subsequently, a command as to the determined energizing current $I_R$ is issued at 848. More specifically, a command as to the energizing current $I_R$ is sent to the drive circuit.

In the feedback control of the pressure-decrease valve, the basic energizing current $I_{R0}$ is supplied to the pressure-increase linear valve 26 in the braking-force decreasing state and in the braking-force constant state. Accordingly, in a strict sense, the feedback control is executed only in the braking-force decreasing state and in the braking-force constant state.

(d) Details of Feedforward Control

In the present system, the braking-force control in the event of servo-pressure sensor failure of S8 is executed in the event of a failure of the servo-pressure sensor 134, in place of the normal-condition braking-force control of S7. In this control, the feedforward control is executed in place of the feedback control explained above. The feedforward control will be explained below in detail.

d-1) Summary of Feedforward Control

In the feedback control explained above, in determining the energizing currents $I_A$, $I_R$ to be respectively supplied to the pressure-increase linear valve 26 and the pressure-decrease linear valve 28, the servo pressure $P_{SRV}$ is used as the braking-force index, and the feedback components $I_{A-FB}$, $I_{R-FB}$ are determined based on the servo-pressure deviation $\Delta P_{SRV}$ that is a difference between the servo pressure $P_{SRV}$ and the target servo pressure $P^*_{SRV}$. When the servo-pressure sensor 134 fails to operate, however, it is impossible to obtain the actual servo pressure $P_{SRV}$ and it is accordingly impossible to determine the feedback components $I_{A-FB}$, $I_{R-FB}$. In view of this, in the feedforward control, the energizing currents $I_A$, $I_R$, that do not contain the feedback components $I_{A-FB}$, $I_{R-FB}$, namely, the energizing current $I_A$ consisting of the feedforward component $I_{A-FF}$ and the energizing current $I_R$ consisting of the feedforward components $I_{R-FF}$ are determined based on the target servo pressure $P^*_{SRV}$, and the determined energizing currents $I_A$, $I_R$ are supplied. In short, the feedforward control is regarded as a control for maintaining the servo pressure $P_{SRV}$ at the target servo pressure $P^*_{SRV}$ while keeping the pressure-increase linear valve 26 and the pressure-decrease linear valve 28 in the valve equilibrium state.

d-2) Ensuring of Braking Force

As explained above, the valve equilibrium state of each of the pressure-increase linear valve 26 and the pressure-decrease linear valve 28 is defined as a state determined by a balance among the electromagnetic acting force $F_{E-A}$, $F_{E-R}$, the pressure-difference-based acting force $F\Delta_{P-A}$, $F\Delta_{P-R}$, and the elastic biasing force $F_{K-A}$, $F_{K-R}$. Due to a change in the characteristics of any of the pressure-increase linear valve 26 and the pressure-decrease linear valve 28 over time or years, the correlation between the energizing currents $I_A$, $I_R$ and the servo pressure $P_{SRV}$ in the valve equilibrium state changes, and there may be a possibility that an intended braking force cannot be obtained even if the energizing currents $I_A$, $I_R$ are determined according to the respective expressions for determining the feedforward components $I_{A-FF}$, $I_{R-FF}$ in the feedback control. Especially when an influence of changes in the elastic biasing forces $F_{K-A}$, $F_{K-R}$ is large and the elastic biasing forces $F_{K-A}$, $F_{K-R}$ become large, the braking force is insufficient even if the energizing currents $I_A$, $I_R$ determined according to the predetermined expressions are respectively supplied to the pressure-increase linear valve 26 and the pressure-decrease linear valve 28 in the feedforward control. In the present system, therefore, in the feedforward control, the feedforward components $I_{A-FF}$, $I_{R-FF}$ are determined according to the respective preset correlations in the valve equilibrium state, and the determined feedforward components $I_{A-FF}$, $I_{R-FF}$ are suitably modified. Thus, the energizing currents $I_A$, $I_R$ are supplied which are the same as those when the feedforward components $I_{A-FF}$, $I_{R-FF}$ are determined based on changed elastic biasing forces $F_{K-A}$, $F_{K-R}$.

More specifically, the relationship between the feedforward component $I_{A-FF}$ and the second pilot pressure $P_{PLT2}$ in the valve equilibrium state of the pressure-increase linear valve 26 is represented as follows by rewriting the above formula:

$$P_{PLT2}=(\alpha_A/\beta_A)\cdot I_{A-FF}-F_{K-A}/\beta_A+P_{ACC}$$

Further, the servo pressure $P_{SRV}$ and the second pilot pressure $P_{PLT2}$ has the following relationship:

$P_{SRV}/P_{PLT2}=\epsilon$ $\epsilon$: pressure increase ratio of the regulator 24

Accordingly, the correlation between the servo pressure $P_{SRV}$ and the feedforward component $I_{A-FF}$ in the valve equilibrium state of the pressure-increase linear valve 26 is represented as follows:

$$P_{SRV}=\epsilon\cdot\{(\alpha_A/\beta_A)\cdot I_{A-FF}-F_{K-A}/\beta_A+P_{ACC}\}$$

Similarly, the relationship between the feedforward component $I_{R-F}$ and the second pilot pressure $P_{PLT2}$ in the valve equilibrium state of the pressure-decrease linear valve 28 is represented as follows by rewriting the above formula:

$$P_{PLT2}=(\alpha_R/\beta_R)\cdot I_{R-FF}-F_{K-R}/\beta_R+P_{RSV}$$

In view of the above relationship between the servo pressure $P_{SRV}$ and the second pilot pressure $P_{PLT2}$, the correlation between the servo pressure $P_{SRV}$ and the feedforward component $I_{R-FF}$ in the valve equilibrium state of the pressure-decrease linear valve 26 is represented by the following expression:

$$P_{SRV}=\epsilon\cdot\{(\alpha_R/\beta_R)\cdot I_{R-FF}-F_{K-R}/\beta_R+P_{RSV}\}$$

The high-pressure-source pressure $P_{ACC}$ and the atmospheric pressure $P_{RSV}$ fall within respective given ranges.

Accordingly, where the high-pressure-source pressure $P_{ACC}$ and the atmospheric pressure $P_{RSV}$ are considered to be constant, a relationship between the servo pressure $P_{SRV}$ and the feedforward component $I_{A-FF}$ in the valve equilibrium state of the pressure-increase linear valve 26 and a relationship between the servo pressure $P_{SRV}$ and the feedforward component $I_{R-FF}$ in the valve equilibrium state of the pressure-decrease linear valve 28 are represented simply as follows:

$$P_{SRV} = a_A \cdot I_{A-FF} + b_A \quad a_A, b_A : \text{coefficients}$$

$$P_{SRV} = a_R \cdot I_{R-FF} + b_R \quad a_R, b_R : \text{coefficients}$$

Figure 8:
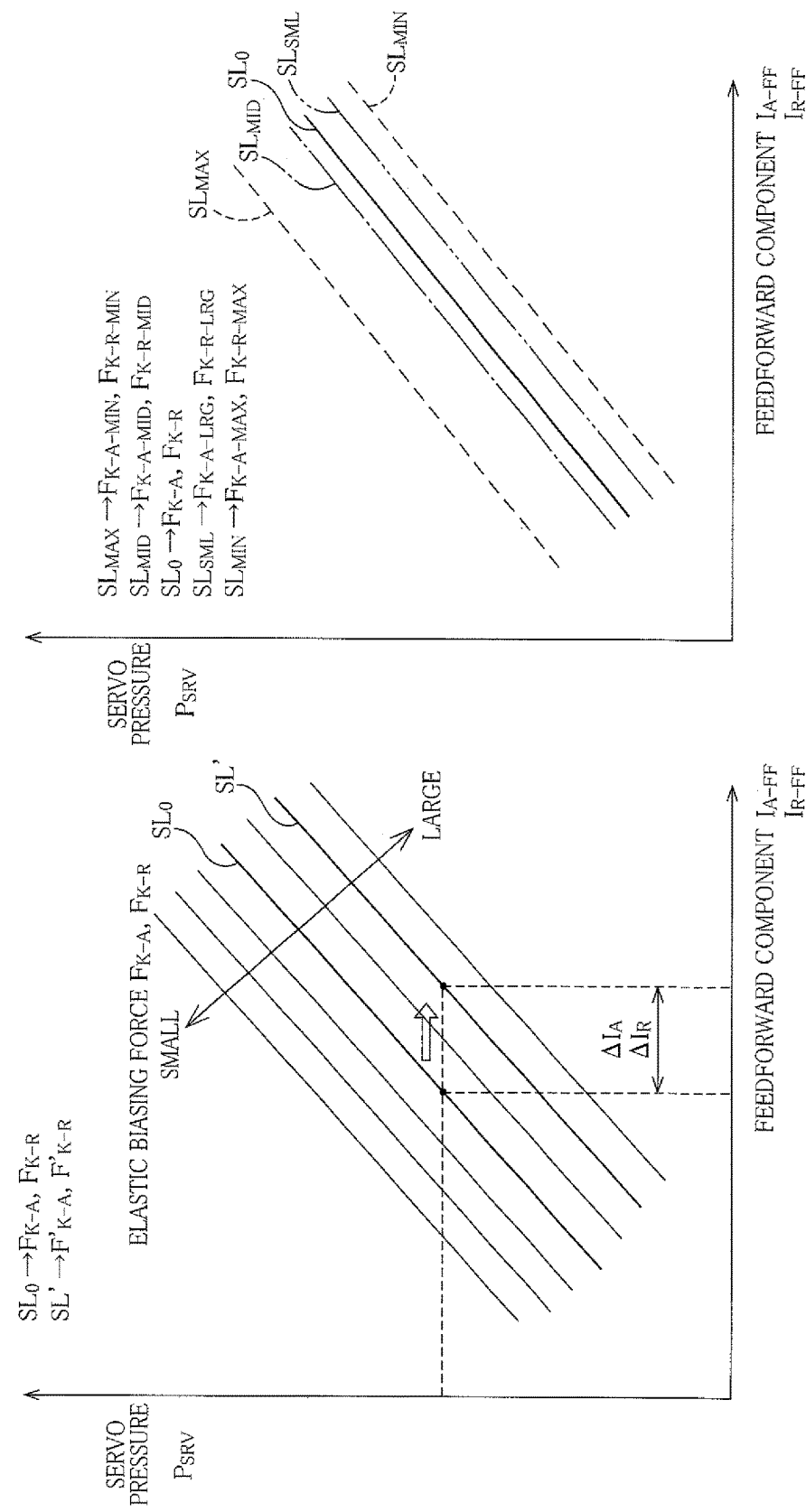
FIGS. 8A and 8B are graphs each showing relationships between feedback component and servo pressure in a valve equilibrium state of each of the pressure-increase linear valve and the pressure-decrease linear valve.

The above two expressions representing the relationships between the servo pressure $P_{SRV}$ and the feedforward components $I_{A-FF}$, $I_{R-FF}$ in the valve equilibrium state are illustrated as characteristic lines each showing a relationship between the energizing current and the feedforward component, as shown in the graph of FIG. 8A. As apparent from the graph, the servo pressure $P_{SRV}$, i.e., the valve equilibrium pressure, becomes higher with an increase in the feedforward components $I_{A-FF}$, $I_{R-FF}$ in the valve equilibrium state. Further, as the above-indicated values $b_A$, $b_R$ become smaller, namely, as the elastic biasing forces $F_{K-A}$, $F_{K-R}$ become larger, the characteristic lines shift downward. That is, the characteristic lines shift toward a side on which the braking force is small.

While taking account of the characteristic changes described above, in the feedforward control of the present system, the feedforward components $I_{A-FF}$, $I_{R-FF}$ are determined according not to a characteristic line ($SL_0$ in FIG. 8A) based on the elastic biasing forces $F_{K-A}$, $F_{K-R}$ each having a value that is preset at the time of manufacture of the vehicle, but to a characteristic line (SL' in FIG. 8A) that is obtained by shifting the characteristic line $SL_0$ toward the side on which the braking force is small. Conceptually, there is executed the same processing as processing in which the feedforward components $I_{A-FF}$, $I_{R-FF}$ are determined by utilizing, in place of the preset elastic biasing forces $F_{K-A}$, $F_{K-R}$, elastic biasing forces $F'_{K-A}$, $F'_{K-R}$ (hereinafter referred to as "corrected elastic biasing forces $F'_{K-A}$, $F'_{K-R}$" where appropriate) that are larger than the preset elastic biasing forces $F_{K-A}$, $F_{K-R}$. More specifically, there are determined, according to the following expressions, given current amounts $\Delta I_A$, $\Delta I_R$ (hereinafter each referred to as "shift amount" where appropriate) by which the energizing currents $I_A$, $I_R$ are shifted:

$$\Delta I_A = (F'_{K-A} - F_{K-A})/\alpha_A$$

$$\Delta I_R = (F'_{K-R} - F_{K-R})/\alpha_R$$

By adding the determined shift amounts $\Delta I_A$, $\Delta I_R$ to the energizing currents $I_A$, $I_R$ determined according to the respective preset correlations between the servo pressure $P_{SRV}$ and the energizing currents $I_A$, $I_R$ in the valve equilibrium state, namely, to the basic energizing currents $I_{A0}$, $I_{R0}$ in a strict sense, the energizing currents $I_A$, $I_R$ are determined. By thus determining the energizing currents $I_A$, $I_R$, the energizing currents $I_A$, $I_R$ to be supplied respectively to the pressure-increase linear valve 26 and the pressure-decrease linear valve 28 in order to attain the same servo pressure $P_{SRV}$ are made larger, by the shift amounts $\Delta I_A$, $\Delta I_R$, than the energizing currents $I_A$, $I_R$ determined according to the preset correlations, as shown in FIG. 8A. That is, in both of the pressure-increase linear valve 26 and the pressure-decrease linear valve 28, the valve equilibrium pressure becomes higher as the energizing currents $I_A$, $I_R$ become larger, and the energizing currents $I_A$, $I_R$ are determined to be equal to respective values that are shifted by the respective shift amounts $\Delta I_A$, $\Delta I_R$ toward a side on which the braking force is large. Accordingly, also in the feedforward control, the braking force is sufficiently obtained without suffering from a shortage of the braking force.

d-3) Shift Amount of Feedforward Component

The energizing currents $I_A$, $I_R$ are shifted in the feedforward control as explained above. The shift amounts $\Delta I_A$, $\Delta I_R$ are selectable from among three kinds according to settings. To be more specific, the shift amounts $\Delta I_A$, $\Delta I_R$ are determined so as to provide the energizing currents $I_A$, $I_R$ in an instance in which the feedforward components $I_{A-FF}$, $I_{R-FF}$ are determined by utilizing one of the three kinds of elastic biasing forces $F_{K-A}$, $F_{K-R}$ that are already set or to be set.

As mentioned above, the elastic biasing force $F_{K-A}$ is a value peculiar to the individual pressure-increase linear valves 26 and the elastic biasing force $F_{K-R}$ is a value peculiar to the individual pressure-decrease linear valves 28, and those values are set at the time of manufacture of the vehicle by actual measurement. However, those values fall within respective specified ranges defined by specified maximum values $F_{R-A-MAX}$, $F_{K-R-MAX}$ and specified minimum values $F_{K-A-MIN}$, $F_{K-R-MIN}$. In this respect, each of the specified maximum values $F_{K-A-MAX}$, $F_{K-R-MAX}$ corresponds to a lower limit of the braking force while each of the specified minimum values $F_{R-A-MIN}$, $F_{K-R-MIN}$ corresponds to an upper limit of the braking force. There are indicated, in FIG. 8B, a characteristic line in the case of the specified maximum values $F_{K-A-MAX}$, $F_{K-R-MAX}$ and a characteristic line in the case of the specified minimum values $F_{R-A-MIN}$, $F_{K-R-MIN}$. As apparent from FIG. 8B, a characteristic line $SL_{MIN}$ in the case of the specified maximum values $F_{K-A-MAX}$, $F_{K-R-MAX}$ (hereinafter referred to as "characteristic line $SL_{MIN}$ of the minimum braking force" where appropriate) represents the lower limit of the braking force in the relationships between the servo pressure PSR and the feedforward components $I_{A-FF}$, $I_{R-FF}$ in the valve equilibrium state. A characteristic line $SL_{MAX}$ in the case of the specified minimum values $F_{K-A-MIN}$, $F_{K-R-MIN}$ (hereinafter referred to as "characteristic line $SL_{MAX}$ of the maximum braking force" where appropriate) represents the upper limit of the braking force in the relationships between the servo pressure $P_{SRV}$ and the feedforward components $I_{A-FF}$, $I_{R-FF}$ in the valve equilibrium state. In other words, the relationships between the servo pressure $P_{SR}$ and the feedforward components $I_{A-FF}$, $I_{R-FF}$ in the valve equilibrium state also fall within respective preset specified ranges.

One of the three kinds of shift amounts $\Delta I_A$, $\Delta I_R$ are shift amounts $\Delta I_A$, $\Delta I_R$ for providing the energizing currents $I_A$, $I_R$ in an instance in which the feedforward components $I_{A-FF}$, $I_{R-FF}$ are determined according to the characteristic line $SL_{MIN}$ of the minimum braking force. The shift amounts $\Delta I_A$, $\Delta I_R$ are determined, according to the following expressions, utilizing the specified maximum values $F_{R-A-MAX}$, $F_{K-R-MAX}$ as the corrected elastic biasing forces $F'_{K-A}$, $F'_{K-R}$:

$$\Delta I_A = (F_{K-A-MAX} - F_{K-A})/\alpha_A$$

$$\Delta I_R = (F_{K-R-MAX} - F_{K-R})/\alpha_R$$

The energizing currents $I_A$, $I_R$ are shifted by the thus determined shift amounts $\Delta I_A$, $\Delta I_R$. In the feedforward control in which the shifted energizing currents $I_A$, $I_R$ are supplied respectively to the pressure-increase linear valve 26 and the pressure-decrease linear valve 28, a sufficient braking force is ensured.

Another one of the three kinds of shift amounts $\Delta I_A$, $\Delta I_R$ are shift amounts $\Delta I_A$, $\Delta I_R$ for providing the energizing currents $I_A$, $I_R$ in an instance in which the feedforward components $I_{A-FF}$, $I_{R-FF}$ are determined according to a characteristic line $SL_{SML}$ of the small-side braking force shown in FIG. 8B. The characteristic line $SL_{SML}$ of the small-side braking force is shifted toward the characteristic line $SL_{MIN}$ of the minimum braking force with respect to a characteristic line $SL_{MIN}$ of the middle braking force that is a middle of the characteristic line $SL_{MIN}$ of the minimum braking force and the characteristic line $SL_{MAX}$ of the maximum braking force. The shift amounts $\Delta I_A$, $\Delta I_R$ are determined utilizing specific large-side values $F_{K-A-LRG}$, $F_{K-R-LRG}$ as the corrected elastic biasing forces $F'_{K-A}$, $F'_{K-R}$. In this respect, the specific large-side values $F_{K-A-LRG}$, $F_{K-R-LRG}$ are values between: specified maximum values $F_{K-A-MAX}$, $F_{K-R-MAX}$; and specified middle values $F_{K-A-MID}$, $F_{K-R-MID}$ that are middle of the specified maximum values $F_{K-A-MAX}$, $F_{K-R-MAX}$ and the specified minimum values $F_{K-A-MIN}$, $F_{K-R-MIN}$. More specifically, the shift amounts $\Delta I_A$, $\Delta I_R$ are determined according to the following expressions:

$$\Delta I_A = (F_{K-A-LRG} - F_{K-A}) / \alpha_A$$

$$\Delta I_R = (F_{K-R-LRG} - F_{K-R}) / \alpha_R$$

The energizing currents $I_A$, $I_R$ are shifted by the thus determined shift amounts $\Delta I_A$, $\Delta I_R$. In the feedforward control in which the shifted energizing currents $I_A$, $I_R$ are supplied respectively to the pressure-increase linear valve 26 and the pressure-decrease linear valve 28, a sufficient braking force is ensured. It is noted that the shift amounts $\Delta I_A$, $\Delta I_R$ are made equal to 0 when the specific large-side values $F_{K-A-LRG}$, $F_{K-R-LRG}$ are smaller than the preset elastic biasing force $F_{K-A}$, $F_{K-R}$.

The last one of the three kinds of shift amounts $\Delta I_A$, $\Delta I_R$ are shift amounts $\Delta I_A$, $\Delta I_R$ for providing the energizing currents $I_A$, $I_R$ in an instance in which the feedforward components $I_{A-FF}$, $I_{R-FF}$ are determined according to relationships between the servo pressure $P_{SRV}$ and the feedforward components $I_{A-FF}$, $I_{R-FF}$ in the valve equilibrium state, the relationships being obtained by learning in the normal-condition braking-force control, namely, in the feedback control. In determination of the shift amounts $\Delta I_A$, $\Delta I_R$, values of the elastic biasing forces $F_{K-A}$, $F_{K-R}$ obtained by learning are utilized as the corrected elastic biasing forces $F'_{K-A}$, $F'_{K-R}$. There will be explained below in detail learning of the elastic biasing forces $F_{K-A}$, $F_{K-R}$, namely, learning of the correlations between the servo pressure $P_{SRV}$ and the feedforward components $I_{A-FF}$, $I_{R-FF}$ in the valve equilibrium state.

d-4) Learning of Correlations Between Servo Pressure and Feedforward Components in Valve Equilibrium State The learning executed in the midst of the feedback control, in other words, the learning of the correlations between the servo pressure $P_{SRV}$ and the feedforward components $I_{A-FF}$, $I_{R-FF}$ in the valve equilibrium state, is executed to avoid a shortage of the braking force in the feedforward control. Accordingly, the learning is executed by recognizing deviations of the respective correlations in the valve equilibrium states from the preset correlations toward the side on which the braking force is small, namely, deviations toward the side on which the servo pressure $P_{SRV}$ is low. In other words, the learning is executed by recognizing how much the elastic biasing forces $F_{K-A}$, $F_{K-R}$ have become larger than the preset values.

The learning for the pressure-increase linear valve 26 is executed when the braking-force increasing state starts. The above-indicated expression for calculating the basic energizing current $I_{A0}$ in the feedback control is rewritten as follows:

$$I_{A0} = I_{R-FF} + I_{R-FB}$$
$$= \{F_{K-A} - \beta_A \cdot (P_{ACC} - P_{PLT2})\} / a_A + Y_A \cdot (P^*_{SRV} - P_{SRV})$$

Figure 9:
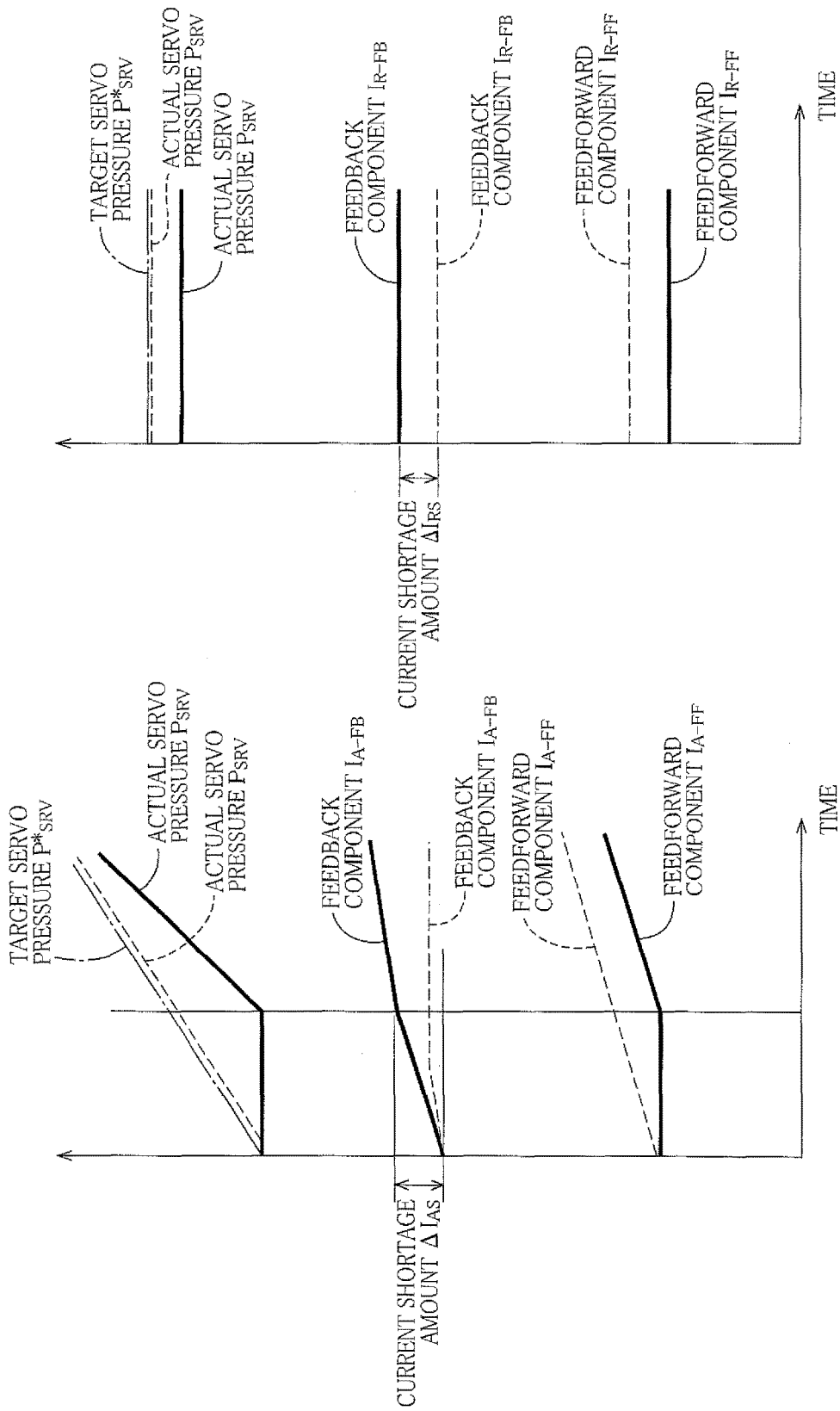
FIGS. 9A and 9B are graphs each for explaining learning of deviations of the relationships between feedforward component and servo pressure in the valve equilibrium state of each of the pressure-increase linear valve and the pressure-decrease linear valve.

With reference to the above expression and FIG. 9A, the second pilot pressure $P_{PLT2}$ is equal to the atmospheric pressure $P_{RSV}$ at the time of start of the braking-force increasing state, and a given feedforward component $I_{A-FF}$ is determined. At this time point, the target servo pressure $P^*_{SRV}$ is equal to the actual servo pressure $P_{SRV}$. Where the correlation in the valve equilibrium state does not deviate from the preset correlation, in other words, where the actual elastic biasing force $F_{K-A}$ is equal to the preset value, the actual servo pressure $P_{SRV}$ increases immediately after the target servo pressure $P^*_{SRV}$ increases from this time point, as indicated by the broken line in FIG. 9A. Further, the feedforward component $I_{A-FF}$ increases immediately from this time point, and the feedback component $I_{A-FB}$ increases by a relatively small amount immediately from this time point. Where the actual elastic biasing force $F_{K-A}$ is larger than the preset value, however, the actual servo pressure $P_{SRV}$ does not increase until the target servo pressure $P^*_{SRV}$ increases to a certain degree, as indicated by the solid line in FIG. 9A. That is, the feedback component $I_{A-FB}$ increases at a relatively steep gradient, and the feedforward component $I_{A-FF}$ starts to increase when the feedback component $I_{A-FB}$ increases to a certain degree. The value of the feedback component $I_{A-FB}$ at a time point when the actual servo pressure $P_{SRV}$ starts to increase corresponds to a shortage amount of the feedforward component $I_{A-FF}$ due to the elastic biasing force $F_{K-A}$ that is larger than the preset value, namely, corresponds to a current shortage amount $\Delta I_{AS}$ at the actual servo pressure $P_{SRV}$. On the basis of the current shortage amount $\Delta I_{AS}$, the actual elastic biasing force $F_{K-A}$ is calculated. The learning described above is executed every time when the braking-force increasing state starts. In the present system, the largest one of the actual elastic biasing forces $F_{K-A}$ obtained by the learning is stored as a learned value $F_{K-A-ST}$, namely, the actual elastic biasing force $F_{K-A}$ corresponding to the correlation in the valve equilibrium state that deviates most is stored as the learned value $F_{K-A-ST}$. By utilizing the learned value $F_{K-A-ST}$, the energizing current $I_A$ to be supplied to the pressure-increase linear valve 26 is made larger than the energizing current $I_A$ according to the preset correlation, by the shift amount $I_A$ calculated by the following expression:

$$\Delta I_A = (F_{K-A-ST} - F_{K-A}) / \alpha_A$$

The learning for the pressure-decrease linear valve 28 is executed in the braking-force constant state. The above-indicated expression for calculating the basic energizing current $I_{R0}$ in the feedback control is rewritten as follows:

$$I_{R0} = I_{R-FF} + I_{R-FB}$$
$$= \{F_{K-R} + \beta_R \cdot (P_{PLT2} - P_{RSV})\} / \alpha_R + \gamma_R \cdot (P^*_{SRV} - P_{SRV})$$

With reference to the above expression and FIG. 9B, where the actual elastic biasing force $F_{K-R}$ is equal to the preset value, the actual servo pressure $P_{SRV}$ is equal to the target servo pressure $P^*_{SRV}$ as indicated by the broken line in FIG. 9B, and the basic energizing current $I_{R0}$ contains only the feedforward component $I_{R-FF}$, in the braking-force constant state. Where the actual elastic biasing force $F_{K-R}$ is larger than the preset value, the actual servo pressure $P_{SRV}$ cannot be maintained at the target servo pressure $P^*_{SRV}$ only by the feedforward component $I_{R-FF}$, and the actual servo pressure $P_{SRV}$ does not reach the target servo pressure $P^*_{SRV}$, as indicated by the solid line in FIG. 9B. As a result, even though the hydraulic brake system is in the braking-force constant state, the feedback component $I_{R-FB}$ is contained in the basic energizing current $I_{R0}$. The value of the feedback component $I_{R-FB}$ at this time point corresponds to a shortage amount of the feedforward component $I_{R-FF}$ due to the elastic biasing force $F_{K-R}$ that is larger than the preset value, namely, corresponds to a current shortage amount $\Delta I_{RS}$ at the actual servo pressure $P_{SRV}$. On the basis of the current shortage amount $\Delta I_{RS}$, the actual elastic biasing force $F_{K-R}$ is calculated. The learning descried above is executed every time when the braking-force constant state is established. In the present system, the largest one of the actual elastic biasing forces $F_{K-R}$ obtained by the learning is stored as a learned value $F_{K-R-ST}$, namely, the actual elastic biasing force $F_{K-R}$ corresponding to the correlation in the valve equilibrium state that deviates most is stored as the learned value $F_{K-R-ST}$. By utilizing the learned value $F_{K-R-ST}$, the energizing current $I_R$ to be supplied to the pressure-decrease linear valve 28 is made larger than the energizing current $I_R$ according to the preset correlation, by the shift amount $\Delta I_R$ calculated by the following expression:

$$\Delta I_R = (F_{K-R-ST} - F_{K-R})/\alpha_R$$

In the feedforward control in which the energizing current $I_A$ shifted by the shift amount $\Delta I_A$ determined as described above is supplied to the pressure-increase linear valve 26 and the energizing current $I_R$ shifted by the shift amount $\Delta I_R$ determined as described above is supplied to the pressure-decrease linear valve 28, a relatively adequate braking force is ensured because the shift amounts $\Delta I_A$, $\Delta I_R$ are obtained based on the learning. In other words, the braking force can be controlled with relatively high accuracy. Where the learned values $F_{K-A-ST}$, $F_{K-R-ST}$ for the actual elastic biasing forces $F_{K-A}$, $F_{K-R}$ are not larger than the preset elastic biasing forces $F_{K-A}$, $F_{K-R}$, the shift amounts $\Delta I_A$, $\Delta I_R$ are made equal to 0. The learning described above is executed by executing a predetermined learning program in parallel with the brake control program. Here, a detailed explanation of a flow chart of the learning program is dispensed with.

d-5) Measure Taken when Braking Force has Become Excessively Large

As explained above, in the feedforward control, the energizing currents $I_A$, $I_R$ are made larger, by the shift amounts $\Delta I_A$, $\Delta I_R$, than the energizing currents $I_A$, $I_R$ respectively consisting of the feedforward components $I_{A-FF}$, $I_{R-FF}$ determined according to the preset correlation in the valve equilibrium state, for the purpose of avoiding a shortage of the braking force. It is expected that the actual servo pressure $P_{SRV}$ becomes excessively high and the braking force accordingly becomes excessively large when the energizing currents $I_A$, $I_R$ that are made larger are supplied. In the present system, therefore, in the feedforward control, it is judged whether the braking force has become larger than a set degree and a measure is taken to make the braking force small when the braking force has become excessively large.

The feedforward control is executed when the servo-pressure sensor 134 fails to operate. Accordingly, the actual servo pressure $P_{SRV}$ cannot be detected when the feedforward control is being executed. Therefore, the judgment whether the braking force is larger than the set degree is made based on a change in the high-pressure-source pressure $P_{ACC}$ detected by the high-pressure-source pressure sensor 96, specifically, based on a reduction in the high-pressure-source pressure $P_{ACC}$. The judgment for the pressure-increase linear valve 26 is made when the feedback control is switched to the feedforward control in the braking-force increasing state and when the braking-force increasing state starts in the feedforward control. The judgment for the pressure-decrease linear valve 28 is made when the braking-force constant state is changed to the braking-force decreasing state in a state in which the feedforward control is being executed.

Figure 10:
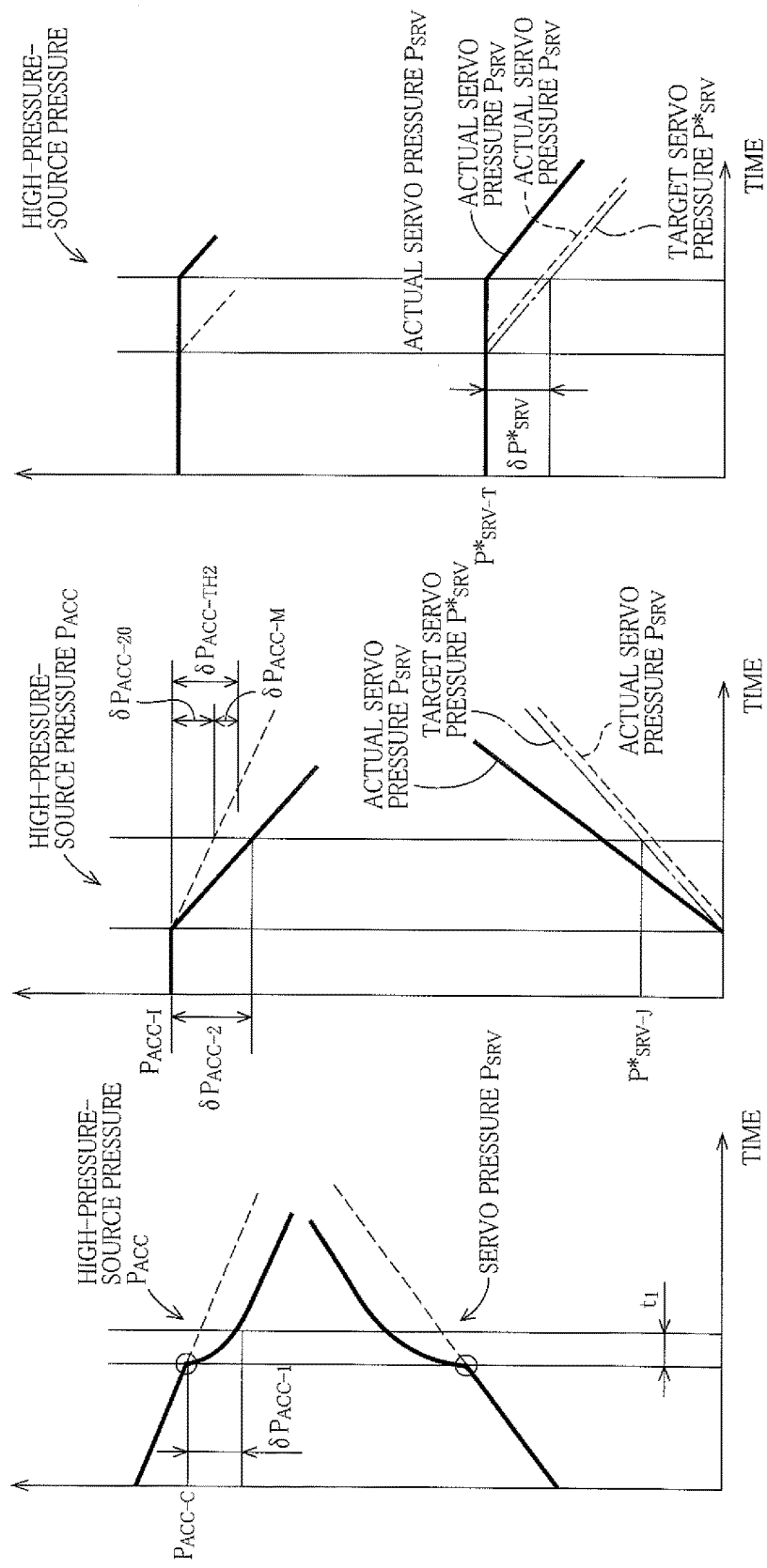
FIGS. 10A-10C are graphs each for explaining a process for judgment, in the feedforward control, whether the energizing current supplied to the pressure-increase linear valve and/or the pressure-decrease linear valve is larger than a set degree.

FIG. 10A is a graph for explaining the judgment for the pressure-increase linear valve 26 that is made when the feedback control is switched to the feedforward control in the braking-force increasing state. Where the energizing current $I_A$ supplied to the pressure-increase linear valve 26 in the feedforward control is appropriate, the servo pressure $P_{SRV}$ increases along generally the same gradient as in the feedback control, as indicated by the broken line in FIG. 10A. In this instance, the working fluid is supplied from the high-pressure-source device 22 to the master cylinder device 16 via the regulator 24 at generally the same supply speed as in the feedback control, and the high-pressure-source pressure $P_{ACC}$ decreases along generally the same gradient as in the feedback control. (Here, the supply speed of the working fluid means a supply amount per unit time.) However, where the energizing current $I_A$ is excessively large, the servo pressure $P_{SRV}$ abruptly increases at the time point when the feedback control is switched to the feedforward control, as indicated by the solid line in FIG. 10A. In this instance, the amount of the working fluid to be supplied to the master cylinder device 16 also abruptly increases, and the high-pressure-source pressure $P_{ACC}$ abruptly decreases. The braking force is judged to be excessively large based on the abrupt decrease in the high-pressure-source pressure $P_{ACC}$. More specifically, it is judged that the braking force is larger than the set degree, namely, it is judged that the energizing current $I_A$ is excessively large when a high-pressure-source-pressure difference $\delta P_{ACC-1}$ becomes larger than a set threshold difference $\delta P_{ACC-TH1}$. Here, the high-pressure-source-pressure difference $\delta P_{ACC-1}$ is a difference between: a high-pressure-source pressure $P_{ACC-C}$ upon switching that is the high-pressure-source pressure $P_{ACC}$ when the feedback control is switched to the feedforward control; and the high-pressure-source pressure $P_{ACC}$ at a time point when a set time $t_1$ has elapsed after the switching.

FIG. 10B is a graph for explaining the judgment for the pressure-increase linear valve 26 that is made at the time of start of the braking-force increasing state in the feedforward control. When the braking-force increasing state starts, the target servo pressure $P^*_{SRV}$ increases. Where the energizing current $I_A$ is appropriate, the actual servo pressure $P_{SRV}$ increases along an increase in the target servo pressure $P^*_{SRV}$, as indicated by the broken line in FIG. 10B. In response to the increase in the actual servo pressure $P_{SRV}$, the high-pressure-source pressure $P_{ACC}$ decreases from a high-pressure-source pressure $P_{ACC-I}$ at the time of start of the braking-force increasing state, as indicated by the broke line in FIG. 10B. In contrast, where the energizing current $I_A$ is excessively large, the actual servo pressure $P_{SRV}$ increases at a steep gradient as indicated by the solid line in FIG. 10A. In this instance, the supply speed of the working fluid from the high-pressure-source device 22 to the master cylinder device 16 via the regulator 24 becomes higher, and the high-pressure-source pressure $P_{ACC}$ decreases at a steeper gradient in accordance with an increase in the supply speed. It is judged that the braking force is larger than the set degree, namely, it is judged that the energizing current $I_A$ is excessively large when a high-pressure-source-pressure difference $\delta P_{ACC-2}$ becomes larger than a set threshold difference $\delta P_{ACC-TH2}$. Here, the high-pressure-source-pressure difference $\delta P_{ACC-2}$ is a difference between: the high-pressure-source pressure $P_{ACC}$ at a time point when the target servo pressure $P^*_{SRV}$ becomes equal to a set pressure $P^*_{SRV-J}$ for judgment; and the high-pressure-source pressure $P_{ACC-I}$ at the time of start of the braking-force increasing state. The set threshold difference $\delta P_{ACC-TH2}$ is a sum of: a reference high-pressure-source-pressure difference $\delta P_{ACC-20}$ corresponding to the high-pressure-source-pressure difference in a case where the energizing current $I_A$ is appropriate; and a margin difference $\delta P_{ACC-M}$.

FIG. 10C is a graph for explaining the judgment for the pressure-decrease linear valve 28 that is made when the braking-force constant state is changed to the braking-force decreasing state in a state in which the feedforward control is being executed. While later explained in detail, the energizing current $I_A$ supplied to the pressure-increase linear valve 26 is not immediately made equal to 0 when the braking-force constant state is changed to the braking-force decreasing state in the feedforward control, but is made equal to 0 when it is judged that the braking force is actually decreased. Therefore, the pressure-increase linear valve 26 is in the valve equilibrium state at the time of start of the braking-force decreasing state. Where the energizing current $I_R$ supplied to the pressure-decrease linear valve 28 is appropriate, the actual servo pressure $P_{SRV}$ starts to decrease without a substantial delay with respect to the decrease in the target servo pressure $P^*_{SRV}$, as indicated by the broke line in FIG. 10C. When the actual servo pressure $P_{SRV}$ starts to decrease, the second pilot pressure $P_{PLT2}$ of the regulator 24 decreases. Because the pressure-increase linear valve 26 is in the valve equilibrium state, the working fluid that is being supplied from the high-pressure-source device 22 flows into the second pilot chamber R9. The inflow of the working fluid causes the high-pressure-source pressure $P_{ACC}$ to be decreased. The decrease in the high-pressure-source pressure $P_{ACC}$ acts as a trigger for the judgment for the pressure-decrease linear valve 28, and the decrease in the high-pressure-source pressure $P_{ACC}$ triggers the energizing current $I_A$ supplied to the pressure-increase linear valve 26 to be made equal to 0.

Where the energizing current $I_R$ supplied to the pressure-decrease linear valve 28 is excessively large, the pressure-decrease linear valve 28 is not placed in the valve equilibrium state immediately after the target servo pressure $P^*_{SRV}$ starts to decrease and the servo pressure $P_{SRV}$ starts to decrease with a delay, as indicated by the solid line in FIG. 10C. That is, the above-indicated decrease in the high-pressure-source pressure $P_{ACC}$ is caused with a delay. By utilizing the phenomenon, it is judged that the braking force is larger than the set degree, namely, it is judged that the energizing current $I_R$ is excessively large when a target servo-pressure difference $\delta P^*_{SRV}$ becomes larger than a set threshold difference $\delta P^*_{SRV-TH}$. Here, the target servo-pressure difference $\delta P^*_{SRV}$ is a difference between: a target servo pressure $P^*_{SRV-T}$ that is the target servo pressure $P^*_{SRV}$ at a time of change from the braking-force constant state to the braking-force decreasing state; and a target servo pressure $P^*_{SRV}$ at a time point when the high-pressure-source pressure $P_{ACC}$ decreases.

Where it is judged that the braking force is larger than the set degree, namely, where it is judged that the energizing currents $I_A$, $I_R$ respectively supplied to the pressure-increase linear valve 26 and the pressure-decrease linear valve 28 are excessively large, the energizing currents $I_A$, $I_R$ are decreased. More specifically, the shift amounts $\Delta I_A$, $\Delta I_R$ are decreased by set decrease amounts $\Delta I_{A-DEC}$, $\Delta I_{R-DEC}$ that are set for decreasing the respective energizing currents $I_A$, $I_R$. In other words, the energizing currents $I_A$, $I_R$ are shifted toward the side on which the braking force is small. The set decrease amounts $\Delta I_{A-DEC}$, $\Delta I_{R-DEC}$ are the shift amounts toward the side on which the braking force is small and are generally set to be considerably smaller than the shift amounts $\Delta I_A$, $\Delta I_R$ for increasing the respective energizing currents $I_A$, $I_R$. Every time when the braking force is judged to be larger than the set degree, the energizing currents $I_A$, $I_R$ are decreased by the respective set decrease amounts $\Delta I_{A-DEC}$, $\Delta I_{R-DEC}$, so that the braking force becomes closer to an appropriate magnitude stepwise. When it is judged that the braking force is larger than the set degree even where the shift amounts $\Delta I_A$, $\Delta I_R$ are 0, namely, even where the energizing currents $I_A$, $I_R$ are not shifted toward the side on which the braking force is large, the shift amounts $\Delta I_A$, $\Delta I_R$ are decreased by the set decrease amounts $\Delta I_{A-DEC}$, $\Delta I_{R-DEC}$. Accordingly, even in the above instance, the braking force having an appropriate magnitude is generated owing to the decrease in the shift amounts $\Delta I_A$, $\Delta I_R$.

(e) Braking-Force Control in the Event of Servo-pressure Sensor Failure

Figure 11:
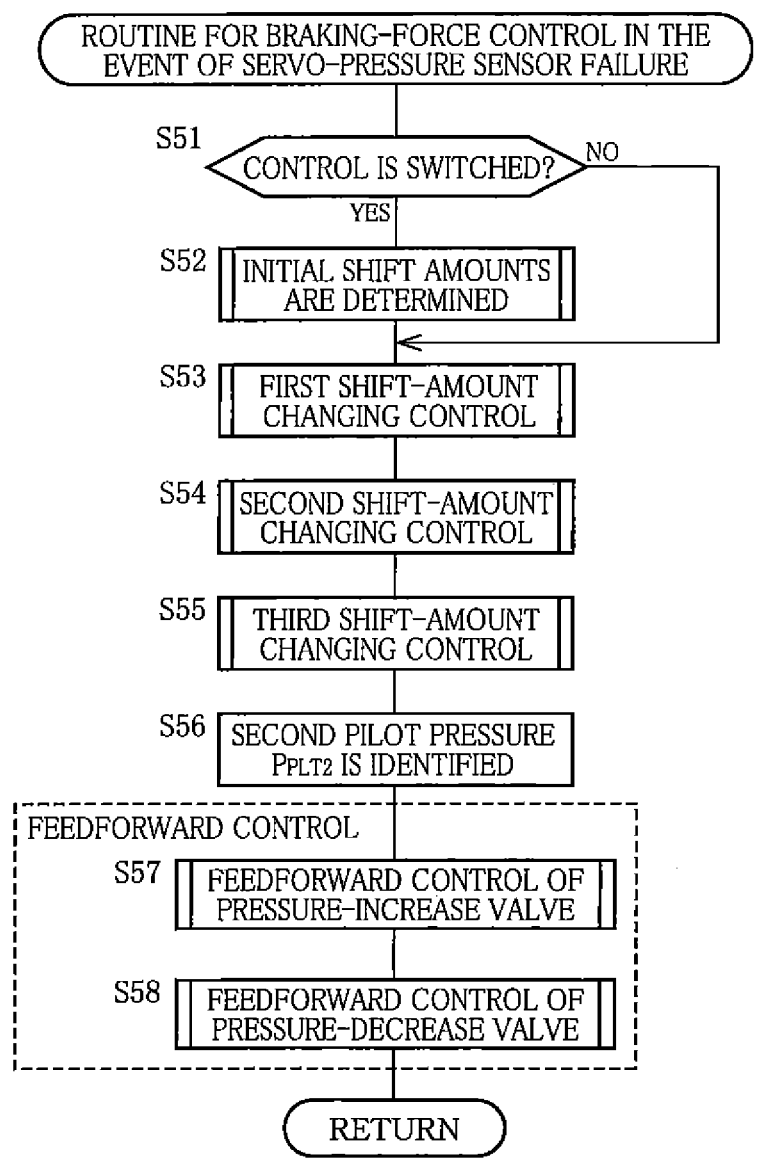
FIG. 11 is a flow chart representing a routine for a braking-force control in the event of servo-pressure sensor failure that is a part of the brake control program.

The braking-force control in the event of servo-pressure sensor failure of S8 in which the above-indicated feedforward control is executed is executed by execution of a routine for the braking-force control in the event of servo-pressure sensor failure represented by a flow chat of FIG. 11. In processing according to the routine, it is initially judged at S51 whether current execution of the routine is the first one after having switched from the normal-condition braking-force control of S7. Where an affirmative decision is made at S51, the shift amounts $\Delta I_A$, $\Delta I_R$ for the respective energizing currents $I_A$, $I_R$ are determined at S52. On the other hand, where the current execution is not the first one, S52 is skipped. At S53-S55, it is judged that the braking force is larger than the set degree, and first through third shift-amount changing controls are executed for changing the shift amounts $\Delta I_A$, $\Delta I_R$ so as to be decreased when the braking force is larger than the set degree. Thereafter, the second pilot pressure $P_{PLT2}$ is identified at S56. This identification is based on the target servo pressure $P^*_{SRV}$ unlike the identification in the normal-condition braking-force control that is based on the actual servo pressure $P_{SRV}$. More specifically, the servo pressure $P_{SRV}$ is regarded to be equal to the target servo pressure $P^*_{SRV}$, and the second pilot pressure $P_{PLT2}$ is identified based on the target servo pressure $P^*_{SRV}$ and the pressure increase ratio e of the regulator 24 indicated above. Subsequently, the feedforward control of the pressure-increase valve and the feedforward control of the pressure-decrease valve that constitute the feedforward control are executed at S57 and S58, respectively. The controls and processing will be explained below in detail.

e-1) Determination of Shift Amount at Initial Stage of Control Switching

Figure 12:
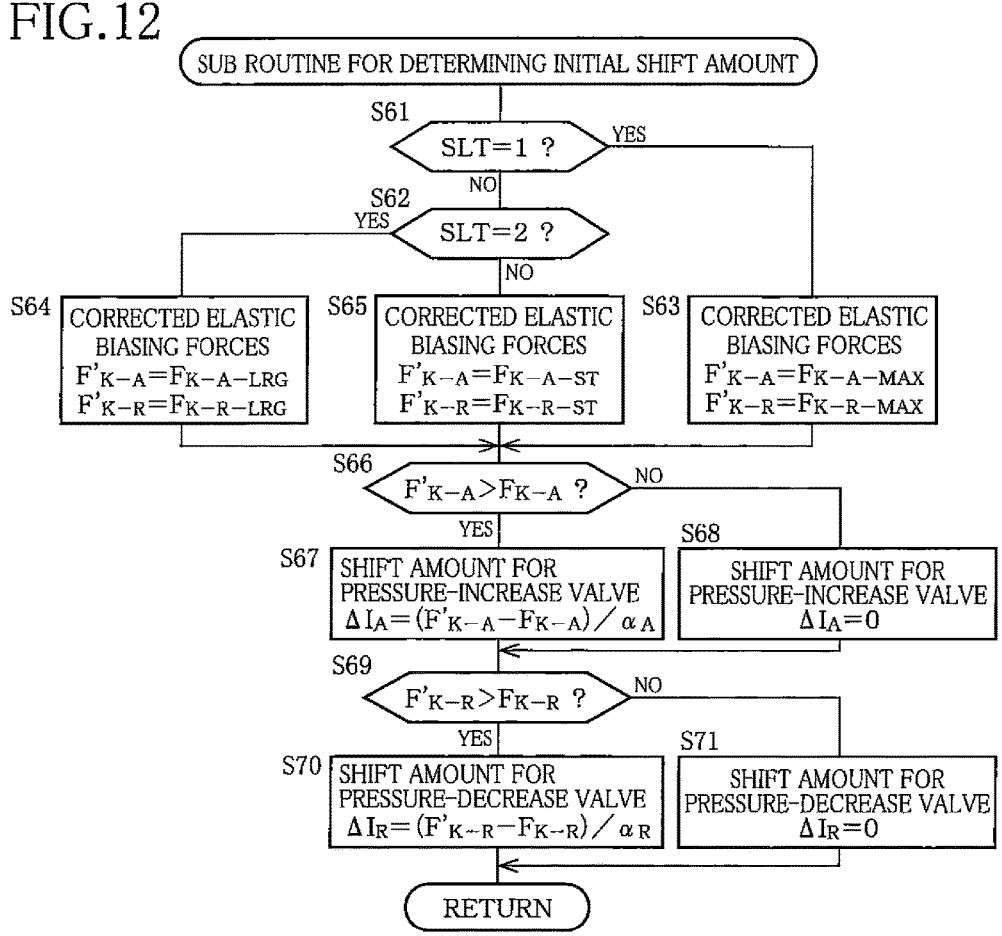
FIG. 12 is a flow chart representing a sub routine for determining an initial shift amount that is a part of the routine for the braking-force control in the event of servo-pressure sensor failure.

Processing for determining the shift amount at S52 executed at an initial stage of control switching is executed by execution of a sub routine for determining the initial shift amount represented by a flow chart of FIG. 12. In the processing according to the sub routine, a value of a shift-amount selection parameter SLT is judged at S61, S62. Any one of values "1", "2", and "3" is set for the parameter depending upon a type, status, or the like, of vehicle. One of the above-indicated three kinds of shift amounts $\Delta I_A$, $\Delta I_R$ is determined depending upon the value of the parameter. More specifically, where the parameter is set at "1", the corrected elastic biasing forces $F'_{K-A}$, $F'_{K-R}$ are made equal to the specified maximum values $F_{K-A-MAX}$, $F_{K-R-MAX}$ at 563, in order to set the shift amounts $\Delta I_A$, $\Delta I_R$ for providing the energizing currents $I_A$, $I_R$ in an instance in which the feedforward components $I_{A-FF}$, $I_{R-FF}$ are determined according to the characteristic line $SL_{MIN}$ of the minimum braking force. Where the parameter is set at "2", the corrected elastic biasing forces $F'_{K-A}$, $F'_{K-R}$ are made equal to the specific large-side values $F_{K-A-LRG}$, $F_{K-R-LRG}$ at S64, in order to set the shift amounts $\Delta I_A$, $\Delta I_R$ for providing the energizing currents $I_A$, $I_R$ in an instance in which the feedforward components $I_{A-FF}$, $I_{R-FF}$ are determined according to the characteristic line $SL_{SML}$ of the small-side braking force. Where the parameter is set at "3", the corrected elastic biasing forces $F'_{K-A}$, $F'_{K-R}$ are made equal to the learned values $F_{K-A-ST}$, $F_{K-R-ST}$ at S65, in order to set the shift amounts $\Delta I_A$, $\Delta I_R$ for providing the energizing currents $I_A$, $I_R$ in an instance in which the feedforward components $I_{A-FF}$, $I_{R-FF}$ are determined according to the respective relationships between the servo pressure $P_{SRV}$ and the feedforward components $I_{A-FF}$, $I_{R-FF}$ in the valve equilibrium state obtained by the learning.

After the corrected elastic biasing forces $F'_{K-A}$, $F'_{K-R}$ are determined as described above, it is judged at S66 whether the corrected elastic biasing force $F'_{K-A}$ for the pressure-increase linear valve 26 is larger than the preset elastic biasing force $F_{K-A}$ utilized in the feedback control. Where the corrected elastic biasing force F'K-A is larger than the elastic biasing force $F_{K-A}$, the shift amount $\Delta I_A$ for the pressure-increase linear valve 26 is determined at S67 according to the above expression based on the corrected elastic biasing force $F'_{K-A}$. On the other hand, where the corrected elastic biasing force $F'_{K-A}$ is equal to or smaller than the elastic biasing force $F_{K-A}$, the shift amount $\Delta I_A$ is made equal to 0 at S68. It is subsequently judged at S69 whether the corrected elastic biasing force $F'_{K-R}$ for the pressure-decrease linear valve 28 is larger than the preset elastic biasing force $F_{K-R}$ utilized in the feedback control. Where the corrected elastic biasing force $F'_{K-R}$ is larger than the elastic biasing force $F_{K-R}$, the shift amount $\Delta I_R$ for the pressure-decrease linear valve 28 is determined at S70 according to the above expression based on the corrected elastic biasing force $F'_{K-R}$. On the other hand, where the corrected elastic biasing force $F'_{K-R}$ is equal to or smaller than the elastic biasing force $F_{K-R}$, the shift amount $\Delta I_R$ is made equal to 0 at S71.

e-2) Shift-amount Changing Control

Figure 13:
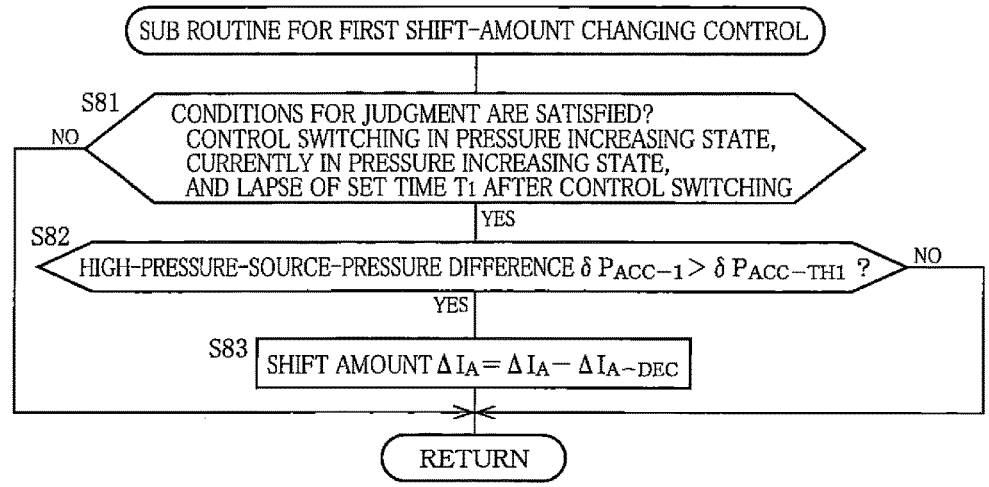
FIG. 13 is a flow chart representing a sub routine for a first shift-amount changing control that is a part of the routine for the braking-force control in the event of servo-pressure sensor failure.

In the first shift-amount changing control of S53, it is judged whether the braking force is larger than the set degree when the normal-condition braking-force control is switched to the braking-force control in the event of servo-pressure sensor failure, and the shift amount $\Delta I_A$ for the pressure-increase linear valve 26 is decreased where it is judged that the braking force is larger than the set degree. The first shift-amount changing control is executed by execution of a sub routine for the first shift-amount changing control represented by a flow chart of FIG. 13. In processing according to the sub routine, it is initially judged at S81 whether conditions for the judgment are satisfied. The conditions are as follows: the control has been switched in the braking-force increasing state; the braking-force increasing state is maintained at the current time point; and a set time $t_1$ has elapsed after the control switching. Where the conditions are judged to be satisfied, it is then judged at S82 whether the high-pressure-source-pressure difference $\delta P_{ACC-1}$ is larger than the set threshold difference $\delta P_{ACC-TH1}$. Where the high-pressure-source-pressure difference $\delta P_{ACC-1}$ is larger than the set threshold difference $\delta P_{ACC-TH1}$, the shift amount $\Delta I_A$ for the pressure-increase linear valve 26 is decreased at S83 by the set decrease amount $\Delta I_{A-DEC}$.

Figure 14:
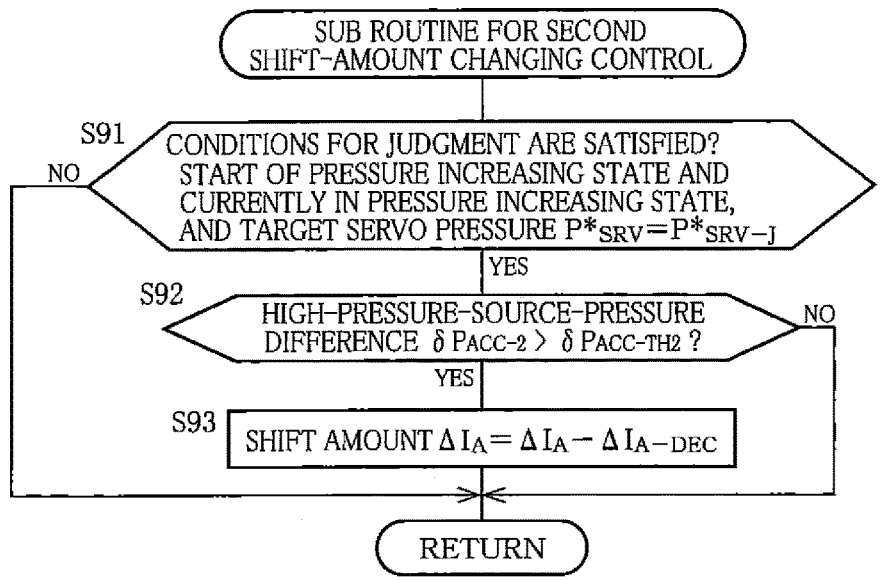
FIG. 14 is a flow chart representing a sub routine for a second shift-amount changing control that is a part of the routine for the braking-force control in the event of servo-pressure sensor failure.

In the second shift-amount changing control of S54, it is judged whether the braking force is larger than the set degree when the braking-force increasing state starts, and the shift amount $\Delta I_A$ for the pressure-increase linear valve 26 is decreased where it is judged that the braking force is larger than the set degree. The control is executed by execution of a sub routine for the second shift-amount changing control represented by a flow chart of FIG. 14. In processing according to the sub routine, it is initially judged at S91 whether conditions for the judgment are satisfied. The conditions are as follows: the braking-force increasing state has started and is maintained at the current time point; and the target servo pressure $P^*_{SRV}$ has become equal to the set pressure $P^*_{SRV-J}$ for judgment. Where the conditions are judged to be satisfied, it is judged at S92 whether the high-pressure-source-pressure difference $\delta P_{ACC-2}$ is larger than the set threshold difference $\delta P_{ACC-TH2}$. Where the high-pressure-source-pressure difference $\delta P_{ACC-2}$ is larger than the set threshold difference $\delta P_{ACC-TH2}$, the shift amount $\Delta I_A$ for the pressure-increase linear valve 26 is decreased at S93 by the set decrease amount $\Delta I_{A-DEC}$.

Figure 15:
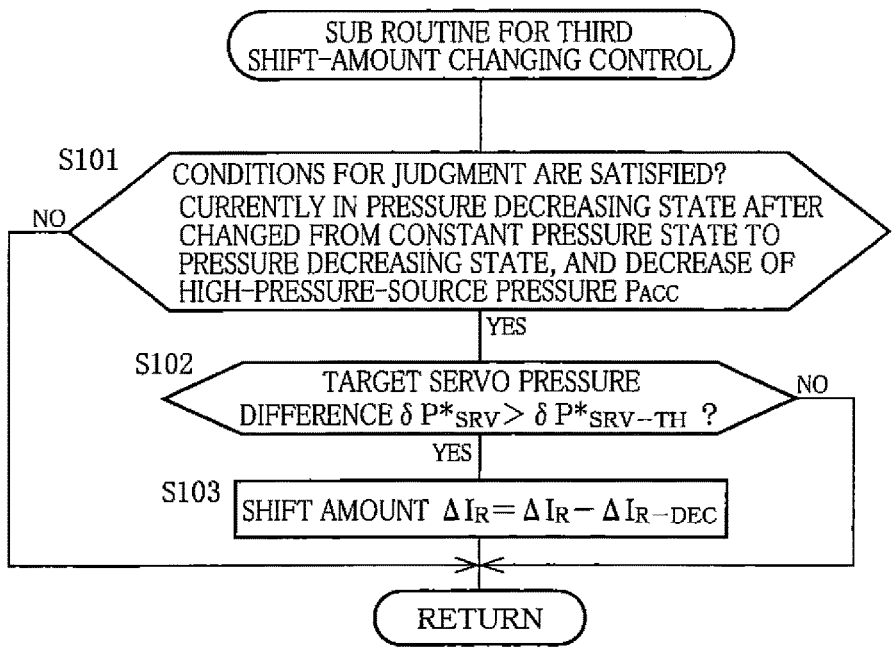
FIG. 15 is a flow chart representing a sub routine for a third shift-amount changing control that is a part of the routine for the braking-force control in the event of servo-pressure sensor failure.

In the third shift-amount changing control of S55, it is judged whether the braking force is larger than the set degree when the braking-force constant state is changed to the braking-force decreasing state, and the shift amount $\Delta I_R$ for the pressure-decrease linear valve 28 is decreased where it is judged that the braking force is larger than the set degree. The control is executed by execution of a sub routine for the third shift-amount changing control represented by a flow chart of FIG. 15. In processing according to the sub routine, it is initially judged at S101 whether conditions for judgment are satisfied. The conditions are as follows: the braking-force constant state has changed to the braking-force decreasing state and is maintained at the current time point; and the high-pressure-source pressure $P_{ACC}$ has decreased. Where it is judged that the conditions are satisfied, it is judged at S102 whether the target servo-pressure difference $\delta P^*_{SRV}$ is larger than the set threshold difference $\delta P^*_{SRV-TH}$. Where the target servo-pressure difference $\delta F_{SRV}$ is larger than the set threshold difference $\delta P^*_{SRV-TH}$, the shift amount $\Delta I_R$ for the pressure-decrease linear valve 28 is decreased at S103 by the set decrease amount $\Delta I_{R-DEC}$.

e-3) Feedforward Control of Pressure-Increase Valve

Figure 16:
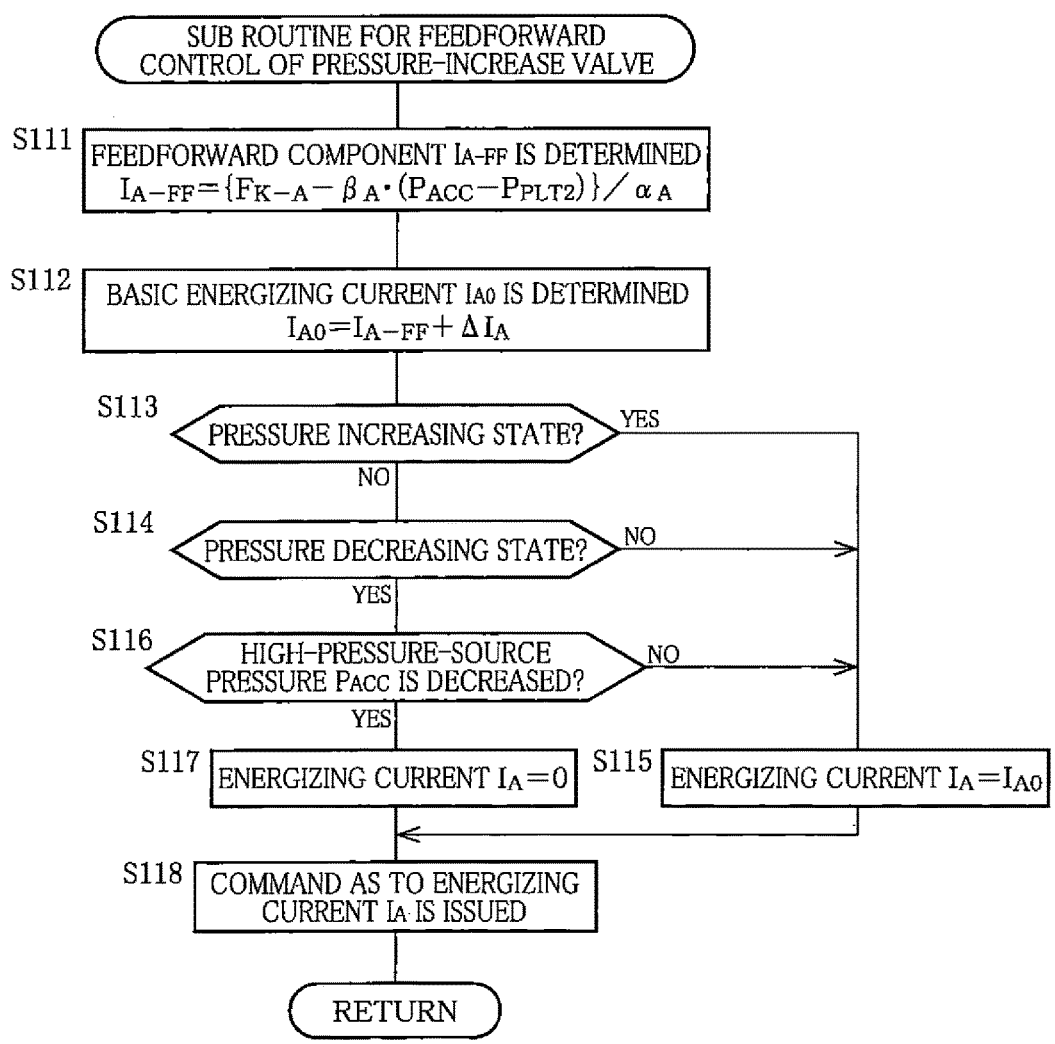
FIG. 16 is a flow chart representing a sub routine for a feedforward control of the pressure-increase valve that is a part of the routine for the braking-force control in the event of servo-pressure sensor failure.

In the feedforward control of the pressure-increase valve of S57, the feedforward component $I_{A-FF}$ is determined according to the technique of the feedforward control, and the energizing current $I_A$ consisting of the determined feedforward component $I_{A-FF}$ is supplied to the pressure-increase linear valve 26. The control is executed, by execution of a sub routine for the feedforward control of the pressure-increase valve represented by a flow chart of FIG. 16.

In processing according to the sub routine for the feedforward control of the pressure-increase valve, the feedforward component $I_{A-FF}$ is determined at S111 according to the same expression as in the feedback control, namely, according to the correlation between the servo pressure $P_{SRV}$ and the energizing current $I_A$ in the valve equilibrium state preset for the pressure-increase linear valve 26. More specifically, the feedforward component $I_{A-FF}$ is determined based on:

the second pilot pressure $P_{PLT2}$ that is identified in dependence on the target servo pressure $P^*_{SRV}$; and the high-pressure-source pressure $P_{ACC}$. Subsequently, at S112, the basic energizing current $I_{A0}$ that is a basis of the energizing current $I_A$ to be actually supplied is determined according to the following expression:

$$I_{A0}=I_{A-FF}+\Delta I_A$$

That is, the basic energizing current $I_{A0}$ is determined by adding the shift amount $\Delta I_A$ to the determined feedforward component $I_{A-FF}$.

After the basic energizing current $I_{A0}$ has been determined as described above, it is judged at S113 and S114 whether the hydraulic brake system is in (A) the braking-force increasing state; (B) the braking-force constant state; or (C) the braking-force decreasing state, as in the feedback control. Where it is judged that the hydraulic brake system is in the braking-force increasing state or in the braking-force constant state, the energizing current $I_A$ to be supplied is determined to be equal to the basic energizing current $I_{A0}$ at S115, as in the feedback control. On the other hand, where it is judged that the hydraulic brake system is in the braking-force decreasing state, it is judged at S116 whether the high-pressure-source pressure $P_{ACC}$ is decreased, unlike in the feedback control. Where it is judged that the high-pressure-source pressure $P_{ACC}$ is decreased, the energizing current $I_A$ is determined to be equal to 0 at S117 from a time point when it is judged that the high-pressure-source pressure $P_{ACC}$ is actually decreased as a result of the judgment. This is for ensuring execution of the third shift-amount changing control. After the determination of the energizing current $I_A$, a command as to the energizing current $I_A$ is issued at S118.

As in the feedback control of the pressure-increase valve, in the feedforward control of the pressure-increase valve, the basic energizing current $I_{A0}$ is supplied to the pressure-increase linear valve 26 in the braking-force increasing state and in the braking-force constant state. Accordingly, in a strict sense, the feedforward control is executed only in the braking-force increasing state and in the braking-force constant state.

e-4) Feedforward Control of Pressure-decrease Valve

Figure 17:
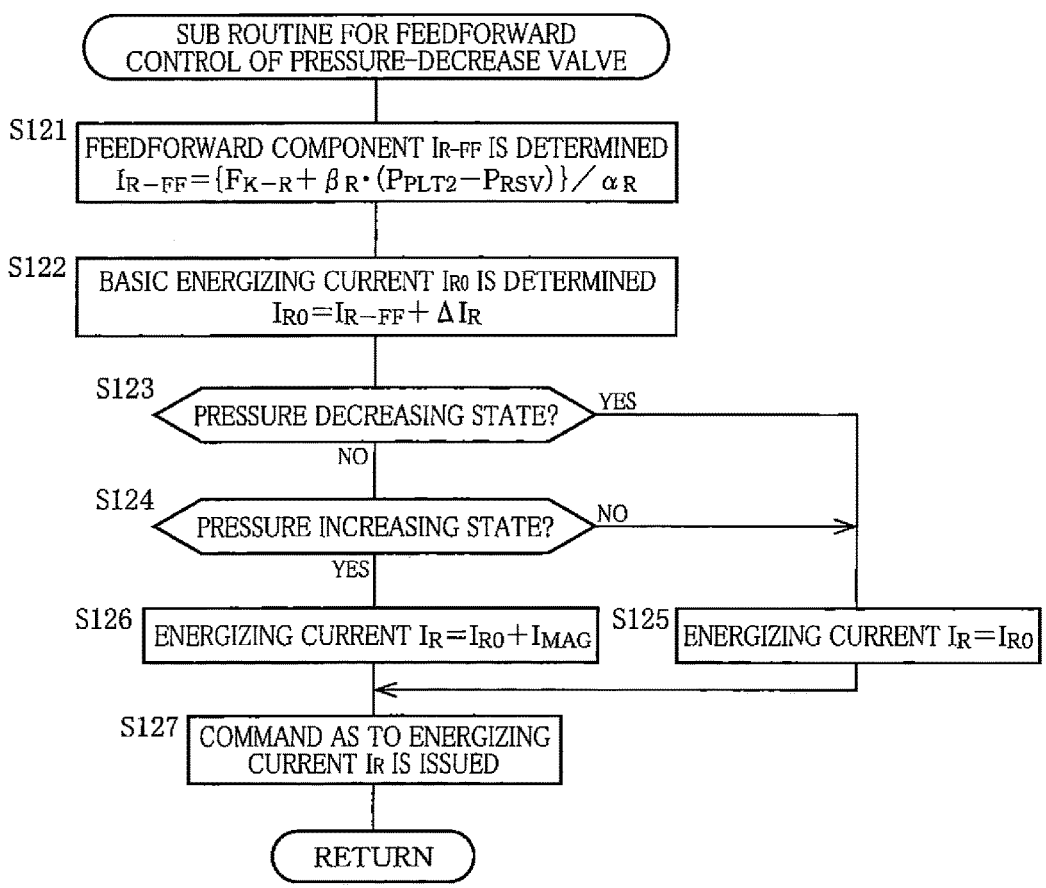
FIG. 17 is a flow chart representing a sub routine for the feedforward control of the pressure-decrease valve that is a part of the routine for the braking-force control in the event of servo-pressure sensor failure.

In the feedforward control of the pressure-decrease valve of S58, the feedforward component $I_{R-FF}$ is determined according to the technique of the feedforward control, and the energizing current $I_R$ consisting of the determined feedforward component $I_{R-FF}$ is supplied to the pressure-decrease linear valve 28. The control is executed by execution of a sub routine for the feedforward control of the pressure-decrease valve represented by a flow chart of FIG. 17.

In processing according to the sub routine for the feedforward control of the pressure-decrease valve, the feedforward component $I_{R-FF}$ is determined at S121 according to the same expression as in the feedback control, namely, according to the correlation between the servo pressure $P_{SRV}$ and the energizing current $I_R$ in the valve equilibrium state preset for the pressure-decrease linear valve 28. More specifically, the feedforward component $I_{R-FF}$ is determined based on: the second pilot pressure $P_{PLT2}$ that is identified in dependence on the target servo pressure $P^*_{SRV}$; and the atmospheric pressure $P_{RSV}$. Subsequently, at S122, the basic energizing current $I_{R0}$ that is a basis of the energizing current $I_R$ to be actually supplied is determined according to the following expression:

$$I_{R0}=I_{R-FF}+\Delta I_R$$

That is, the basic energizing current $I_{R0}$ is determined by adding the shift amount $\Delta I_R$ to the determined feedforward component $I_{R-FF}$.

After the basic energizing current $I_{R0}$ has been determined, it is judged at S123 and S124 whether the hydraulic brake system is in: (A) the braking-force increasing state; (B) the braking-force constant state; or (C) the braking-force decreasing state, as in the feedback control. Where it is judged that the hydraulic brake system is in the braking-force decreasing state or in the braking-force constant state, the energizing current $I_R$ to be supplied is determined to be equal to the basic energizing current $I_{R0}$ at S125, as in the feedback control. On the other hand, where it is judged that the hydraulic brake system is in the braking-force increasing state, the energizing current $I_R$ is determined to be equal to a sum of the basic energizing current $I_{R0}$ and the margin current $I_{MAG}$ at S126, as in the feedback control. After the determination of the energizing current $I_R$, a command as to the energizing current $I_R$ is issued at S127.

As in the feedback control of the pressure-decrease valve, in the feedforward control of the pressure-decrease valve, the basic energizing current $I_{R0}$ is supplied to the pressure-decrease linear valve 28 in the braking-force constant state and in the braking-force decreasing state. Accordingly, in a strict sense, the feedforward control is executed only in the braking-force constant state and in the braking-force decreasing state.

(f) Functional Structure of Controller

Figure 18:
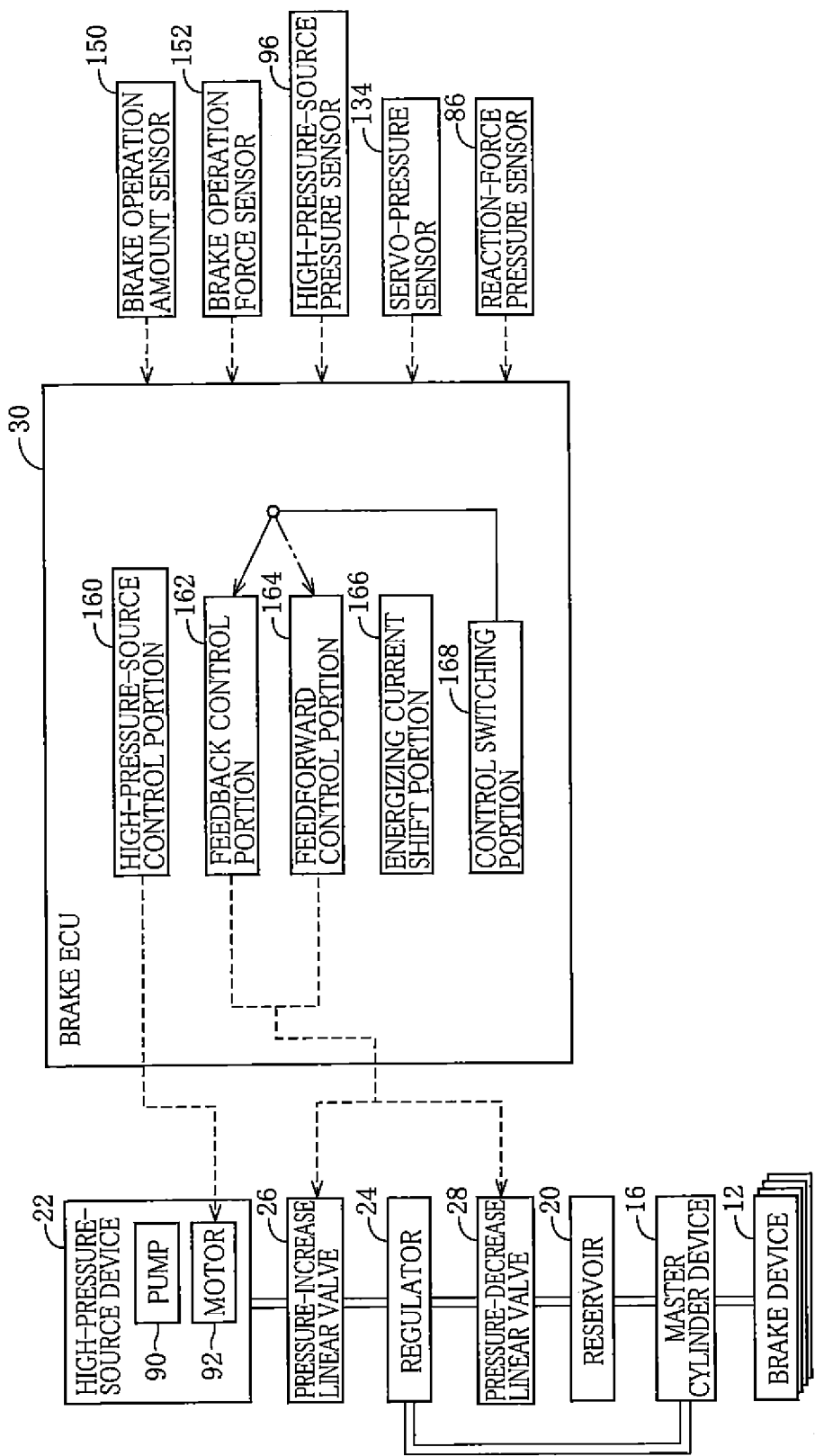
FIG. 18 is a block diagram showing functions of a brake electronic control unit (ECU).

The brake ECU 30, as a controller of the present system, configured to execute the processing according to the above brake control program is regarded as having a functional structure as shown in the block diagram of FIG. 18, in view of its control functions. More specifically, the brake ECU 30 has: a high-pressure-source control portion 160 configured to control the high-pressure-source device 22; a feedback control portion 162 configured to determine the energizing currents $I_A$, $I_R$ based on the feedforward components and the feedback components and to supply the determined energizing currents $I_A$, $I_R$ respectively to the pressure-increase linear valve 26 and the pressure-decrease linear valve 28; a feedforward control portion 164 configured to determine the energizing currents $I_A$, $I_R$ based on the feedforward components and to supply the determined energizing currents $I_A$, $I_R$ respectively to the pressure-increase linear valve 26 and the pressure-decrease linear valve 28; an energizing current shift portion 166 configured to shift the energizing currents $I_A$, $I_R$ in the determination of the energizing currents $I_A$, $I_R$ by the feedforward control; and a control switching portion 168 configured to switch a functional portion to execute a control of the energizing currents $I_A$, $I_R$ to be respectively supplied to the pressure-increase linear valve 26 and the pressure-decrease linear valve 28, from the feedback control portion to the feedforward control portion, in the event of a failure of the servo-pressure sensor 134.

The functional structure will be explained in relation to the processing according to the brake control program. The high-pressure-source control portion 160 may be regarded as a functional portion that functions by execution of the routine for the high-pressure-source control shown in FIG. 4. The feedback control portion 162 is regarded as a functional portion that functions by execution of S24, S25 of the routine for the normal-condition braking-force control shown in FIG. 5, namely, by execution of the sub routine for the feedback control of the pressure-increase valve shown in FIG. 6 and the sub routine for the feedback control of the pressure-decrease valve shown in FIG. 7. The feedforward control portion 164 is regarded as a functional portion that functions by execution of S57, S58 of the routine for the braking-force control in the event of servo-pressure sensor failure, namely, by execution of the sub routine for the feedforward control of the pressure-increase valve shown in FIG. 16 and the sub routine for the feedforward control of the pressure-decrease valve shown in FIG. 17. The energizing current shift portion 166 is regarded as a functional portion that functions by execution of S52-S56 of the routine for the braking-force control in the event of servo-pressure sensor failure shown in FIG. 11, namely, by execution of the sub routine for determining the initial shift amount shown in FIG. 12, the sub routine for the first shift-amount changing control shown in FIG. 13, the sub routine for the second shift-amount changing control shown in FIG. 14, and the sub routine for the third shift-amount changing control shown in FIG. 15. The control switching portion 168 is regarded as a functional portion that functions by execution of 56 of the main flow shown in FIG. 3, namely, by execution of the processing in which the normal-condition braking-force control is switched to the braking-force control in the event of servo-pressure sensor failure.

<Modified Examples>

There will be explained below modified examples of the illustrated embodiment to which the claimable invention is applicable.

In the system according to the illustrated embodiment, the pressure of the working fluid from the high-pressure-source device 22 is regulated by the regulator 24, and the pressure-regulated working fluid is supplied to the master cylinder device 16. Further, the working fluid is pressurized in the master cylinder device 16 by the pressure of the working fluid supplied thereto, and the pressurized working fluid is supplied to the brake devices 12. In place of such a structure, the regulated working fluid supplied from the regulator 24 may be supplied directly to the brake devices, for instance. Further, the system may be configured not to have the regulator 24, and the pressure of the working fluid from the high-pressure-source device 22 may be adjusted by the pressure-increase linear valve 26 and the pressure-decrease linear valve 28, for instance. In this case, the working fluid whose pressure has been adjusted may be supplied directly to the master cylinder device 16. In this arrangement, the adjusted pressure may be utilized as the braking-force index. Moreover, the pressure of the working fluid from the high-pressure-source device 22 may be adjusted by the pressure-increase linear valve 26 and the pressure-decrease linear valve 28, and the working fluid whose pressure has been adjusted may be supplied directly to the brake devices 12. Also in this arrangement, the adjusted pressure may be utilized as the braking-force index. In the system according to the illustrated embodiment, there may be provided a master-pressure sensor for detecting a master pressure that is a pressure of the working fluid to be supplied from the master cylinder device 16 to the brake devices 12, and the master pressure may be utilized as the braking-force index.

In the system according to the illustrated embodiment, the normally closed pressure-increase linear valve 26 and the normally open pressure-decrease linear valve 28 are used. A normally open linear valve may be used as the pressure-increase linear valve 26, and a normally closed linear valve may be used as the pressure-decrease linear valve 28. In this instance, the energizing currents $I_A$, $I_R$ for ensuring the braking force may be shifted in a direction in which the energizing currents $I_A$, $I_R$ are decreased.

In the system according to the illustrated embodiment, the energizing current $I_A$ (the basic energizing current $I_{A0}$) determined according to the technique of the feedback control or the feedforward control is supplied to the pressure-increase linear valve 26 only in the braking-force increasing state and in the braking-force constant state while the energizing current $I_R$ (the basic energizing current $I_{R0}$) determined according to the technique of the feedback control or the feedforward control is supplied to the pressure-decrease linear valve 28 only in the braking-force constant state and in the braking-force decreasing state. In place of such an arrangement, the energizing currents $I_A$, $I_R$ determined according to the technique of the feedback control or the feedforward control may be supplied in all of the braking-force increasing state, the braking-force constant state, and the braking-force decreasing state. Instead, the energizing currents $I_A$, $I_R$ determined according to the technique of the feedback control or the feedforward control may be supplied in only arbitrary one or two of those states.

In the system according to the illustrated embodiment, in the feedforward control, the shifting of the energizing currents $I_A$, $I_R$ for ensuring the braking force is conducted for both of the pressure-increase linear valve 26 and the pressure-decrease linear valve 28. Instead, the shifting of the energizing currents $I_A$, $I_R$ for ensuring the braking force may be conducted for only one of the pressure-increase linear valve 26 and the pressure-decrease linear valve 28.

DESCRIPTION OF REFERENCE SIGNS

12: brake device 14: brake pedal (brake operation member) 16: master cylinder device 20: reservoir (low-pressure source) 22: high-pressure-source device 24: regulator (pressure regulator) 26: electromagnetic pressure-increase linear valve 28: electromagnetic pressure-decrease linear valve 30: brake electronic control unit (controller) 134: servo-pressure sensor (braking-force index detector) 140: distal end (valve member) 142: plunger 144: valve seat 146: spring (elastic biasing mechanism) 148: coil (electromagnetic coil) 160: high-pressure-source control portion 162: feedback control portion 164: feedforward control portion 166: energizing current shift portion 168: control switching portion R9: second pilot chamber $P_{ACC}$: high-pressure-source pressure $P_{PLT2}$: second pilot pressure $P_{AJT}$: adjusted pressure $P_{RSV}$: atmospheric pressure $P_{SRV}$: servo pressure (braking-force index) $P^*_{SRV}$: target servo pressure (target braking-force index) $F\Delta_{P-A}$, $F\Delta_{P-R}$: pressure-difference-based acting force $F_{K-A}$, $F_{K-R}$: elastic biasing force $F_{E-A}$, $F_{E-R}$: electromagnetic acting force $I_A$, $I_R$: energizing current $I_{A-FF}$, $I_{R-FF}$: feedforward component $I_{A-FB}$, feedback component $\Delta I_A$, $\Delta I_R$: shift amount

The invention claimed is:

1. A hydraulic brake system for braking a vehicle, comprising:

a high-pressure-source device configured to supply a working fluid that is highly pressurized;

an electromagnetic pressure-increase linear valve and an electromagnetic pressure-decrease linear valve configured to adjust a pressure of the working fluid supplied from the high-pressure-source device to an adjusted pressure;

a brake device provided in a wheel and configured to receive the working fluid having the adjusted pressure or a pressure in accordance with the adjusted pressure and to generate a braking force having a magnitude in accordance with the pressure of the received working fluid;

a braking-force index detector configured to detect a braking-force index indicative of the braking force; and a controller configured to control the braking force generated by the brake device by controlling an energizing current supplied to each of the pressure-increase linear valve and the pressure-decrease linear valve, wherein the controller is configured to selectively execute one of: (a) a feedback control in which a feedback component that is a component of the energizing current supplied to each of the pressure-increase linear valve and the pressure-decrease linear valve is determined based on a difference between an actual braking-force index detected by the braking-force index detector and a target braking-force index that is a target of the braking-force index in a control, so as to lessen the difference and in which the energizing current that contains the feedback component is supplied to each of the pressure-increase linear valve and the pressure-decrease linear valve; and (b) a feedforward control in which a feedforward component that is a component of the energizing current supplied to each of the pressure-increase linear valve and the pressure-decrease linear valve is determined based on the target braking-force index, without determining the difference between the actual braking-force index detected by the braking-force index detector and the target braking-force index, so as to place each of the pressure-increase linear valve and the pressure-decrease linear valve in a valve equilibrium state that is a boundary between a valve open state and a valve closed state and in which the energizing current that contains the feedforward component is supplied to each of the pressure-increase linear valve and the pressure-decrease linear valve, and wherein the controller is configured to determine, when the feedforward control is executed, the energizing current supplied to at least one of the pressure-increase linear valve and the pressure-decrease linear valve so as to cause the braking force to be larger than the braking force caused when the energizing current is determined in an instance in which the feedforward component is set according to a preset relationship between the braking-force index and the energizing current in the valve equilibrium state.

2. The hydraulic brake system according to claim 1, wherein the controller is configured to determine, as the feedforward component, the energizing current according to the preset relationship between the braking-force index and the energizing current in the valve equilibrium state based on the actual braking-force index detected by the braking-force index detector and is configured to supply an energizing current that contains the determined feedforward component and the feedback component to each of the pressure-increase linear valve and the pressure-decrease linear valve, in the feedback control.

3. The hydraulic brake system according to claim 1, wherein the controller is configured to execute the feedback control in a case where the braking-force index detector operates normally and is configured to execute the feedforward control in a case of a failure of the braking-force index detector.

4. The hydraulic brake system according to claim 1, wherein the controller is configured to detect, in the feedback control, a deviation of an actual relationship between the braking-force index and the energizing current in the valve equilibrium state from the preset relationship, and wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship between the braking-force index and the energizing current in the valve equilibrium state at the time of occurrence of the detected deviation.

5. The hydraulic brake system according to claim 1, wherein the preset relationship between the braking-force index and the energizing current in the valve equilibrium state falls within a preset specified range, and wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship corresponding to a lower limit of the braking force in the specified range.

6. The hydraulic brake system according to claim 1, wherein the preset relationship between the braking-force index and the energizing current in the valve equilibrium state falls within a preset specified range, and wherein the controller is configured to determine, when the feedforward control is executed, the energizing current supplied to the at least one of the pressure-increase linear valve and the pressure-decrease linear valve so as to be equal to an energizing current in an instance in which the feedforward component is determined according to a relationship that is shifted toward a lower limit of the braking force with respect to a middle of the braking force between the lower limit and an upper limit of the braking force in the specified range.

7. The hydraulic brake system according to claim 1, wherein the controller is configured to determine, when the feedforward control is executed, the energizing current supplied to the at least one of the pressure-increase linear valve and the pressure-decrease linear valve so as to be equal to a value that is shifted, by a given current amount, toward the side on which the braking force is large, as compared with the energizing current in an instance in which the feedforward component is determined according to the preset relationship between the braking-force index and the energizing current in the valve equilibrium state.

8. The hydraulic brake system according to claim 1, wherein each of the pressure-increase linear valve and the pressure-decrease linear valve has (A) a valve seat, (B) a valve member configured to be seated on the valve seat so as to effectuate the valve closed state and configured to be separated away from the valve seat so as to effectuate the valve open state, (C) an elastic biasing mechanism configured to bias, by an elastic biasing force, the valve member in one of a direction in which the valve member is seated on the valve seat and a direction in which the valve member is separated away from the valve seat, and (D) an electromagnetic coil configured to generate an electromagnetic acting force by the energizing current supplied thereto and configured to bias the valve member in the other of the direction in which the valve member is seated on the valve seat and the direction in which the valve member is separated away from the valve seat, the valve equilibrium state being effectuated by a balance among the elastic biasing force, the electromagnetic acting force, and a pressure-difference-based acting force that acts on the valve member in dependence on the adjusted pressure, and wherein the controller is configured to determine, in the feedforward control, the energizing current supplied to the at least one of the pressure-increase linear valve and the pressure-decrease linear valve so as to be equal to an energizing current in an instance in which the feedforward component is determined according to a relationship between the braking-force index and the energizing current in the valve equilibrium state when the elastic biasing force is changed to a value different from a preset value.

9. The hydraulic brake system according to claim 1, wherein the controller is configured to judge whether the braking force is larger than a set degree and to change the energizing current supplied to the at least one of the pressure-increase linear valve and the pressure-decrease linear valve to a value that is shifted toward a side on which the braking force is small where it is judged that the braking force is larger than the set degree, in the feedforward control.

10. The hydraulic brake system according to claim 9, wherein the controller is configured such that, when the energizing current supplied to the at least one of the pressure-increase linear valve and the pressure-decrease linear valve is changed to the value that is shifted toward the side on which the braking force is small, the energizing current is changed to the value that is shifted by a current amount smaller than a current amount when shifted toward the side on which the braking force is large, in the feedforward control.

11. The hydraulic brake system according to claim 9, wherein the controller is configured to judge, based on a change in the pressure of the working fluid supplied from the high-pressure-source device, whether the braking force is larger than the set degree, in the feedforward control.

12. The hydraulic brake system according to claim 1, further comprising a pressure regulator having a pilot chamber and configured to regulate the pressure of the working fluid supplied from the high-pressure-source device to a pressure in accordance with a pressure of the working fluid in the pilot chamber and to supply the working fluid whose pressure is regulated, wherein the pressure-increase linear valve is disposed between the high-pressure-source device and the pilot chamber for increasing the pressure of the working fluid in the pilot chamber, and the pressure-decrease linear valve is disposed between the pilot chamber and a low-pressure source for decreasing the pressure of the working fluid in the pilot chamber, whereby the pressure of the working fluid in the pilot chamber is adjusted to the adjusted pressure, and wherein the brake device is configured to receive the working fluid supplied from the pressure regulator or the working fluid having a pressure in accordance with a pressure of the working fluid supplied from the pressure regulator and to generate the braking force having a magnitude in accordance with the pressure of the received working fluid.

13. The hydraulic brake system according to claim 12, further comprising a master cylinder device to which a brake operation member is connected and which is configured to receive the working fluid supplied from the pressure regulator and to supply, to the brake device, the working fluid that is pressurized depending on the pressure of the received working fluid to a pressure in accordance with the pressure of the received working fluid, without depending on a brake operation force applied to the brake operation member by a driver, wherein the hydraulic brake system is configured to permit the brake device to generate the braking force having a magnitude in accordance with the pressure of the working fluid supplied from the master cylinder device to the brake device.

14. The hydraulic brake system according to claim 1, further comprising a master cylinder device to which a brake operation member is connected, the master cylinder device being configured to receive the working fluid whose pressure is adjusted to the adjusted pressure by the pressure-increase linear valve and the pressure-decrease linear valve and configured to supply, to the brake device, the working fluid that is pressurized depending on the pressure of the received working fluid to a pressure in accordance with the pressure of the received working fluid, without depending on a brake operation force applied to the brake operation member by a driver, wherein the hydraulic brake system is configured to permit the brake device to generate the braking force having a magnitude in accordance with the pressure of the working fluid supplied from the master cylinder device to the brake device.

* * * * *